(12) United States Patent
Owaki

(10) Patent No.: US 10,066,072 B2
(45) Date of Patent: Sep. 4, 2018

(54) COMPOSITE RESIN PARTICLES, PROCESS FOR PRODUCING SAME, EXPANDABLE BEADS, EXPANDED BEADS, FOAMED MOLDED OBJECT, AND AUTOMOTIVE INTERIOR TRIM

(71) Applicant: SEKISUI PLASTICS CO., LTD., Osaka (JP)

(72) Inventor: Hiroki Owaki, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 37 days.

(21) Appl. No.: 15/512,222

(22) PCT Filed: Aug. 31, 2015

(86) PCT No.: PCT/JP2015/074675
§ 371 (c)(1),
(2) Date: Mar. 17, 2017

(87) PCT Pub. No.: WO2016/047382
PCT Pub. Date: Mar. 31, 2016

(65) Prior Publication Data
US 2017/0275432 A1 Sep. 28, 2017

(30) Foreign Application Priority Data
Sep. 26, 2014 (JP) ................................ 2014-197471

(51) Int. Cl.
| | |
|---|---|
| B60R 13/02 | (2006.01) |
| C08F 255/02 | (2006.01) |
| C08J 9/00 | (2006.01) |
| C08J 9/14 | (2006.01) |
| C08J 9/18 | (2006.01) |
| C08J 9/228 | (2006.01) |
| C08L 23/06 | (2006.01) |
| C08L 23/08 | (2006.01) |
| C08L 25/06 | (2006.01) |

(52) U.S. Cl.
CPC .............. *C08J 9/18* (2013.01); *B60R 13/02* (2013.01); *C08F 255/02* (2013.01); *C08J 9/0061* (2013.01); *C08J 9/141* (2013.01); *C08J 9/228* (2013.01); *C08L 23/06* (2013.01); *C08L 23/0815* (2013.01); *C08L 25/06* (2013.01); *C08J 2201/032* (2013.01); *C08J 2203/14* (2013.01); *C08J 2203/182* (2013.01); *C08J 2323/02* (2013.01); *C08J 2323/04* (2013.01); *C08J 2325/06* (2013.01); *C08J 2423/02* (2013.01); *C08J 2423/04* (2013.01); *C08J 2425/06* (2013.01)

(58) Field of Classification Search
CPC .............. C07F 255/02; C08J 9/19; C08J 9/228
See application file for complete search history.

(56) References Cited

U.S. PATENT DOCUMENTS

| | | | | |
|---|---|---|---|---|
| 7,579,384 | B2 * | 8/2009 | Matsumura ................ | C08J 9/18 428/304.4 |
| 7,767,723 | B2 * | 8/2010 | Matsumura ............ | C08J 9/0061 521/139 |
| 7,767,724 | B2 * | 8/2010 | Matsumura ........... | C08F 255/02 521/139 |
| 8,476,325 | B2 * | 7/2013 | Matsumura ........... | C08F 255/02 521/139 |
| 8,592,494 | B2 * | 11/2013 | Matsumura ........... | C08F 255/02 428/304.4 |
| 9,988,511 | B2 * | 6/2018 | Terasaki ................. | C08J 9/0023 |
| 2012/0003478 | A1 | 1/2012 | Matsumura et al. | |
| 2017/0002163 | A1 * | 1/2017 | Terasaki ................. | C08J 9/0023 |

FOREIGN PATENT DOCUMENTS

| | | |
|---|---|---|
| JP | 2009-114432 A | 5/2009 |
| JP | 2011-58008 A | 3/2011 |
| JP | 2012-214567 A | 11/2012 |
| JP | 2012-214691 | 11/2012 |
| JP | 2013/181074 A | 9/2013 |
| JP | 2013-203863 A | 10/2013 |
| WO | 2006/027944 A1 | 3/2006 |
| WO | 2007/099833 A1 | 9/2007 |
| WO | 2007/138916 A1 | 12/2007 |

OTHER PUBLICATIONS

International Search Report issued with respect to Application No. PCT/JP2015/074675, dated Dec. 1, 2015.
International Search Report issued with respect to Application No. PCT/JP2015/074675, dated Mar. 28, 2017.
European Search Report issued in European Patent Office (EPO) Patent Application No. 15845195.5, dated Mar. 13, 2018.

* cited by examiner

*Primary Examiner* — Melissa A Rioja
(74) *Attorney, Agent, or Firm* — Greenblum & Bernstein, P.L.C.

(57) ABSTRACT

Composite resin particles comprising 50 to 800 parts by mass of a polystyrene-based resin with respect to 100 parts by mass of a polyolefin-based resin, wherein: when transmission electron microscope (TEM) images obtained by photographing cross-sections of the composite resin particles using a TEM at a magnification of 1,000 are subjected to a binarization processing and areas in the obtained binarized images which correspond to a cross-sectional area of 437.584 $\mu m^2$ of the composite resin particles are subjected to image analysis, the polystyrene-based resin satisfies the following requirements: (1) the number of dispersed particles is 180 or more; (2) the maximum of the areas of dispersed particles is 200 $\mu m^2$ or less; and (3) the coefficient of variation in dispersion is 100% or more, and the composite resin particles exhibit an inner morphology that includes a mixture of sea-island structure regions and co-continuous structure regions.

10 Claims, 8 Drawing Sheets

COMPOSITE RESIN PARTICLES, PROCESS FOR PRODUCING SAME, EXPANDABLE BEADS, EXPANDED BEADS, FOAMED MOLDED OBJECT, AND AUTOMOTIVE INTERIOR TRIM

TECHNICAL FIELD

The present invention relates to composite resin particles and a process for producing the same (method for producing the same), expandable beads (expandable particles), expanded beads (expanded particles), a foamed molded object (an expanded molded article) and an automotive interior trim. More specifically, the present invention relates to composite resin particles that can provide expanded particles and an expanded molded article having both high impact resistance (absorbance) and high expandability and a method for producing the same, expandable particles obtained therefrom, expanded particles, an expanded molded article and an automotive interior trim.

BACKGROUND ART

Expanded molded articles comprising a polystyrene-based resin have been frequently used as packaging materials and thermal insulating materials because such expanded molded articles have excellent shock-absorbing and thermal insulating properties and are readily formable. The expanded molded articles are, however, insufficient in impact resistance and in plasticity and thus become cracked or chipped easily. Therefore, the expanded molded articles are not suited for packaging some items such as precision apparatuses.

On the other hand, expanded molded articles comprising a polyolefin-based resin are excellent in impact resistance and in plasticity but require large-scale equipment at a time of molding these expanded molded articles. Moreover, because of the properties of the resin, the polyolefin-based resin needs to be transported in the form of pre-expanded particles from a raw material maker to a molding and processing maker. Since the pre-expanded particles that are bulky need to be transported, some problems arise such as high production costs.

Because of the above reasons, various polystyrene-based composite resin particles which have the merits of the above-described two resins and expanded molded articles using these resin particles have been suggested.

For example, WO 2007/138916 (Patent Document 1) discloses a method for producing expandable polyethylene-based resin particles comprising polymerizing core particles containing an ethylene-vinyl acetate copolymer and a linear low-density polyethylene with a styrene-based monomer or a monomer mixture containing a styrene-based monomer and immersing a blowing agent therein.

An object of the technique is to provide expandable polyethylene-based resin particles and an expanded molded article which have excellent expansion moldability over a prolonged period of time and maintain impact resistance, bending deflection and restoration from repetitive stress/strain, which are characteristic of expanded olefin-based resin molded articles. Patent Document 1 discloses that the object is achieved by polymerizing a styrene-based monomer in the presence of core particles containing a specific component and immersing a blowing agent therein.

WO 2006/027944 (Patent Document 2) discloses that a modified polyethylene-based resin expanded molded article which is obtained by expansion molding of a non-cross-linked linear low-density polyethylene-based resin obtained by polymerization using a conventional Ziegler-Natta catalyst is insufficient for automotive members such as shock-absorbing materials, interior trims and bumpers for which impact resistance is required and cannot fulfil further high impact resistance. Patent Document 2 further points out that in a method wherein such a polyethylene-based resin without an inorganic nucleating agent is used, resulting modified resin particles may have a styrene-based resin dispersed in the form of particles in the vicinity of the surface of the particles while the styrene-based resin is hardly dispersed in the form of particles at the central part of the particles, resulting in a continuous phase, and thus cannot fulfil high impact resistance. On the basis of the above, Patent Document 2 discloses a technique of which object is to provide styrene modified linear low-density polyethylene-based resin particles which provide an extremely excellent expanded molded article having an extremely excellent strength.

According to the technique, a styrene-based monomer is added to linear low-density polyethylene-based resin particles obtained by polymerization using a metallocene compound as a catalyst and then the styrene-based monomer is polymerized at a temperature which is 10 to 35° C. higher than the crystallization peak temperature of the low-density polyethylene-based resin. Patent Document 2 discloses that, because of this, the styrene-based resin can be dispersed in the form of particles not only in the vicinity of the surface of the particles but also in the vicinity of the central part thereof and styrene modified linear low-density polyethylene-based resin particles can be obtained which can provide an expanded molded article sufficiently exhibiting impact resistance of the ethylene-based resin and rigidity of the styrene-based resin.

Further, WO 2007/099833 (Patent Document 3) discloses a technique an object of which is to provide a styrene modified polypropylene-based resin expanded molded article which has excellent mechanical properties and chemical resistance and remedies the defects of both the polystyrene-based resin expanded molded article and the polypropylene-based resin expanded molded article.

CITATION LIST

Patent Literatures

Patent Document 1: WO 2007/138916
Patent Document 2: WO 2006/027944
Patent Document 3: WO 2007/099833

SUMMARY OF INVENTION

Technical Problems

However, the background art such as Patent Documents 1 to 3 is insufficient and there is a need for composite resin particles that can provide further improved properties.

The present invention, therefore, has an object of providing composite resin particles which can provide expanded particles and an expanded molded article having both high impact resistance and high expandability and a method for producing the same, and expandable particles, expanded particles, an expanded molded article and an automotive interior trim obtained therefrom.

Solution to Problems

As a result of considerable deliberation, the inventors of the present invention founds that composite resin particles which contain a polyolefin-based resin and a polystyrene-based resin at specific mass proportions and exhibits an inner morphology that includes a mixture of sea-island structure regions in which particles of the polystyrene-based resin are dispersed in the polyolefin-based resin and co-continuous structure regions in which particles of the polystyrene-based resin having indefinite shapes are dispersed in the polyolefin-based resin have both impact resistance and expandability, and that the composite resin particles can be obtained by using a polyolefin resin having at least two melting peaks in a differential scanning calorimetry (DSC) curve obtained by DSC as a nucleus resin for seed polymerization and polymerizing a styrene being immersed in the polyolefin resin under a specific temperature condition.

The present invention, therefore, provides composite resin particles comprising 50 to 800 parts by mass of a polystyrene-based resin with respect to 100 parts by mass of a polyolefin-based resin, wherein:

when transmission electron microscope (TEM) images obtained by photographing cross-sections of the composite resin particles using a TEM at a magnification of 1,000 are subjected to a binarization processing and areas in the obtained binarized images which correspond to a cross-sectional area of 437.584 μm$^2$ of the composite resin particles are subjected to image analysis, the polystyrene-based resin satisfies the following requirements:

(1) the number of dispersed particles is 180 or more;
(2) the maximum of the areas of dispersed particles is 200 μm$^2$ or less; and
(3) the coefficient of variation in dispersion is 100% or more, and the composite resin particles exhibit an inner morphology that includes a mixture of sea-island structure regions in which particles of the polystyrene-based resin are dispersed in the polyolefin-based resin and co-continuous structure regions in which particles of the polystyrene-based resin having an indefinite shape is dispersed in the polyolefin-based resin.

The present invention also provides:

expandable particles obtained by immersing a blowing agent in the composite resin particles;

expanded particles obtained by pre-expansion of the expandable particles;

an expanded molded article obtained by expansion molding in a cavity of the expanded particles; and an automotive interior trim formed by the expanded molded article.

The present invention also provides a method for producing the composite resin particles, comprising the steps of:

(A) dispersing, in an aqueous suspension containing a dispersant, particles of a polyolefin-based resin having at least two melting peaks in a differential scanning calorimetry (DSC) curve obtained by DSC; a styrene-based monomer; and 0.1 to 0.9 parts by mass of a polymerization initiator per 100 parts by mass of the styrene-based monomer;

(B) heating the resulting dispersion at a temperature at which the styrene-based monomer does not substantially polymerize and immersing the styrene-based monomer in the particles of the polyolefin-based resin; and (C) carrying out first polymerization of the styrene-based monomer at a temperature of T2 to (T2+35)° C., wherein T2° C. is the highest melting peak temperature among the melting peaks, or comprising, in addition to the steps (A) to (C), the step of:

(D) following the first polymerization, adding the styrene-based monomer and 0.1 to 0.9 parts by mass of a polymerization initiator per 100 parts by mass of the styrene-based monomer and carrying out of immersion of the styrene-based monomer in the particles of the polyolefin-based resin and second polymerization at a temperature of (T1−10) to (T2+5)° C., wherein T1° C. is the lowest melting peak temperature among the melting peaks.

Advantageous Effects of Invention

The present invention can provide composite resin particles that can provide expanded particles and an expanded molded article having both high impact resistance and high expandability and a method for producing the same, and expandable particles, expanded particles, an expanded molded article and an automotive interior trim obtained therefrom.

The method for producing the composite resin particles of the present invention further exhibits the excellent effects described above when at least one of the following requirements is satisfied:

(1) a temperature difference between the melting peak temperature T2 and the melting peak temperature T1 is 10 to 50° C.;
(2) the melting peak temperature T1 is 90° C. or higher;
(3) the polyolefin-based resin has at least two crystallization peaks in the DSC curve among which a crystallization peak at the highest temperature has a maximum peak area; and
(4) the polyolefin-based resin contains a component selected from a polyethylene resin and an ethylene-acryl copolymer resin.

DESCRIPTION OF EMBODIMENTS

[Composite Resin Particles]

Figure 1:
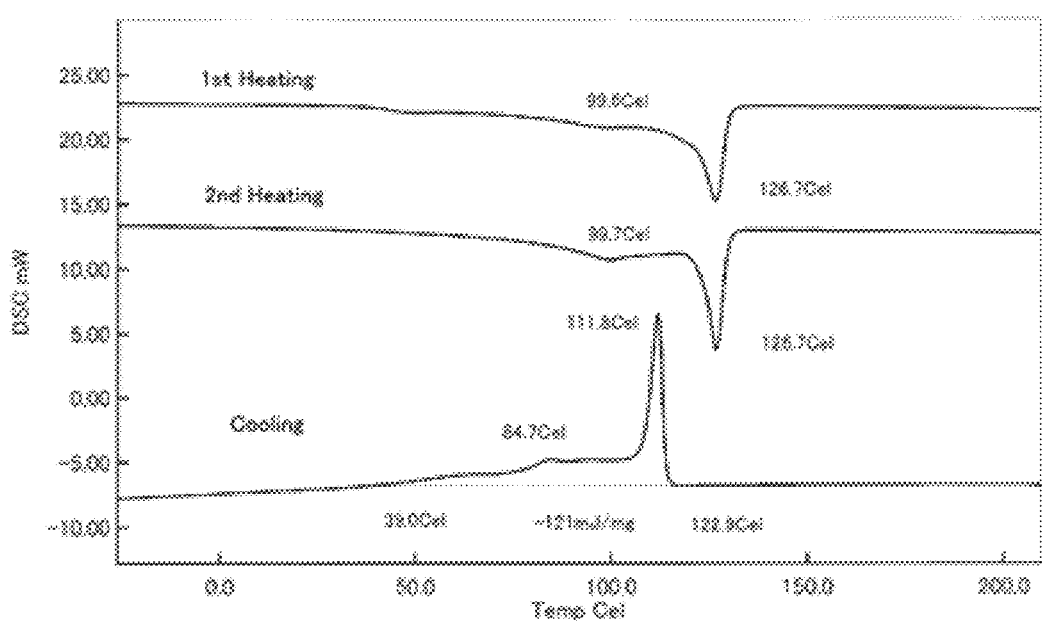
FIG. 1 is a differential scanning calorimetry (DSC) chart obtained by DSC for explaining the melting peak temperature of a polyolefin-based resin (resin A of Example 1).

Composite resin particles of the present invention include 50 to 800 parts by mass of a polystyrene-based resin with respect to 100 parts by mass of a polyolefin-based resin, wherein when transmission electron microscope (TEM) images obtained by photographing cross-sections of the composite resin particles using a TEM at a magnification of 1,000 are subjected to a binarization processing and areas in the obtained binarized images which correspond to a cross-sectional area of 437.584 $\mu m^2$ of the composite resin particles are subjected to image analysis, the polystyrene-based resin satisfies the following requirements:

(1) the number of dispersed particles is 180 or more;
(2) the maximum of the areas of dispersed particles is 200 $\mu m^2$ or less; and
(3) the coefficient of variation in dispersion is 100% or more, and the composite resin particles exhibit an inner morphology that includes a mixture of sea-island structure regions in which particles of the polystyrene-based resin are dispersed in the polyolefin-based resin and co-continuous structure regions in which the polystyrene-based resin having an indefinite shape is dispersed in the polyolefin-based resin.

The composite resin particles of the present invention may be obtained by, for example, the method for producing composite resin particles of the present invention and the materials forming the composite resin particles and the like are described together with the production method.

(Morphology)

As image analysis of binarized images, there are no particular limitations so long as the analytical values described above are obtained thereby. For example, the image processing software (manufactured by Nanosystem Corporation, product name: Nano Hunter NS2K-Pro/Lt) described in Examples can automatically carry out from binarization processing of TEM images to acquisition of analytical values. Specific analysis (measurement) method is described in Examples.

The number of dispersed particles of the polystyrene-based resin in the requirement (1) means the number of styrene polymer particles which have an area of 0.05 $\mu m^2$ or more and are dispersed in the polyolefin resin in the region of the composite resin particles having a cross-sectional area of 437.584 $\mu m^2$ in binarized images which are obtained by a binarization processing of transmission electron microscope (TEM) images obtained by photographing cross-sections of the composite resin particles using a TEM at a magnification of 1,000.

If the number of dispersed particles is less than 180, the sea-island structure in which the particles of the polystyrene-based resin are dispersed in the polyolefin-based resin may be reduced and impact resistance may be insufficient which is characteristic of the sea-island structure. On the other hand, if the number of dispersed particles is extremely high, the co-continuous structure in which particles having indefinite shapes are dispersed may be reduced and expandability may not be exhibited which is characteristic of the co-continuous structure.

The number of dispersed particles is, for example, 180, 200, 250, 300, 350, 400, 450, 500, 550, 600, 650, 700, 750, 800, 850, 900, 950 or 1000.

The number of dispersed particles is preferably 200 to 1000.

The maximum of the areas of dispersed particles of the polystyrene-based resin in the requirement (2) means the area of a dispersed polystyrene-based resin particle having the largest area among the styrene polymer dispersed in the polyolefin resin in the region of the composite resin particles having a cross-sectional area of 437.584 $\mu m^2$ in binarized images which are obtained by a binarization processing of transmission electron microscope (TEM) images obtained by photographing cross-sections of the composite resin particles using a TEM at a magnification of 1,000.

If the maximum of the areas of dispersed particles is above 200 $\mu m^2$, the co-continuous structure in which particles having indefinite shapes are dispersed may be excessive and the sea-island structure may be reduced, and thus impact resistance may be insufficient which is characteristic of the sea-island structure. On the other hand, if the maximum of the areas of dispersed particles is too small, the co-continuous structure in which particles having indefinite shapes are dispersed may be reduced and expandability may not be exhibited which is characteristic of the co-continuous structure.

The maximum of the areas of dispersed particles ($\mu m^2$) is, for example, 1, 2.5, 5, 7.5, 10, 15, 20, 25, 30, 35, 40, 45, 50, 55, 60, 65, 70, 75, 80, 85, 90, 95, 100, 110, 120, 130, 140, 150, 160, 170, 180, 190 or 200.

The maximum of the areas of dispersed particles is preferably 25 to 180 $\mu m^2$.

The coefficient of variation in dispersion of particles of the polystyrene-based resin in the requirement (3) means a value obtained by calculating a standard deviation based on the data such as the maximum of the areas of dispersed particles, the minimum of the areas of dispersed particles, the sum of the areas of dispersed particles and the number of dispersed particles of the polystyrene-based resin in the region of the composite resin particles having a cross-sectional area of 437.584 $\mu m^2$ in binarized images which are obtained by a binarization processing of transmission electron microscope (TEM) images obtained by photographing cross-sections of the composite resin particles using a TEM at a magnification of 1,000 and dividing the standard deviation by an average. Generally, the coefficient of variation in dispersion is increased when the variations in the maximum of the areas of dispersed particles and the minimum of the areas of dispersed particles are increased.

If the coefficient of variation in dispersion is less than 100%, the co-continuous structure in which particles having indefinite shapes are dispersed may be reduced and expandability may not be exhibited which is characteristic of the co-continuous structure. On the other hand, if the coefficient of variation in dispersion is extremely high, the co-continuous structure in which particles having indefinite shapes are dispersed may be excessive and the sea-island structure may be reduced, and thus impact resistance may be insufficient which is characteristic of the sea-island structure.

The coefficient of variation in dispersion (%) is, for example, 100, 125, 150, 175, 200, 225, 250, 275, 300, 350, 400, 450, 500, 550, 600, 650, 700, 750, 800, 850, 900, 950 or 1000.

The coefficient of variation in dispersion is preferably 100 to 1000% and still more preferably 100 to 300%.

The composite resin particles of the present invention have a specific particle structure of the polyolefin-based resin and the polystyrene-based resin as shown in, for example, FIGS. 4(a) and (b). Namely, the composite resin particles of the present invention have a structure of a mixture of regions (sea-island structure) in which polystyrene-based resin particles (islands) are dispersed in a matrix (sea) of the polyolefin-based resin and regions (co-continuous structure) in which the polyolefin-based resin and polystyrene-based resin particles are present together while the polystyrene-based resin particles are integrated to the polyolefin-based resin, and satisfy the requirements (1) to (3).

It is believed that because the composite resin particles of the present invention have a structure in which the polyolefin-based resin and the polystyrene-based resin have the structure of a mixture of the sea-island structure and the co-continuous structure, namely exhibit an inner morphology that includes a mixture of sea-island structure regions in which particles of the polystyrene-based resin are dispersed in the polyolefin-based resin and co-continuous structure regions in which the polystyrene-based resin having an indefinite shape is dispersed in the polyolefin-based resin, the effects of the present invention are exhibited.

Meanwhile, composite resin particles which do not satisfy at least one of the requirements (1) to (3) do not have a particle structure of the composite resin particles of the present invention.

For example, composite resin particles which satisfy other than the requirement (3) have a particle structure which includes only the sea-island structure shown in, for example, FIGS. 6(a) and (b). Composite resin particles which satisfy only the requirement (3) have a particle structure which includes only the co-continuous structure shown in, for example, FIGS. 7(a) and (b).

Composite resin particles which satisfy other than the requirement (1) have a particle structure which includes only the co-continuous structure and composite resin particles which satisfy only the requirement (1) have the sea-island structure in which polystyrene having a large dispersed area is uniformly dispersed.

Composite resin particles which satisfy other than the requirement (2) have a particle structure which includes the sea-island structure and composite resin particles which satisfy only the requirement (2) have a particle structure which includes the co-continuous structure.

In a method for producing the composite resin particles of the present invention, the polymerization temperature is controlled, and thus the sea-island structure and the co-continuous structure are controlled, namely the proportion of the structures is controlled to allow control of physical properties of the composite resin particles.

(Average Particle Diameter)

It is desirable that the composite resin particles are 0.5 to 2.0 mm in average particle diameter.

If the average particle diameter of the composite resin particles is less than 0.5 mm, expandability may decrease. On the other hand, if the average particle diameter of the composite resin particles exceeds 2.0 mm, filling property of the pre-expanded particles may become insufficient at the time of molding and processing an article.

The average particle diameter (mm) of the composite resin particles is, for example, 0.5, 0.6, 0.7, 0.8, 0.9, 1.0, 1.1, 1.2, 1.3, 1.4, 1.5, 1.6, 1.7, 1.8, 1.9 or 2.0.

The composite resin particles are more preferably 0.8 to 1.5 mm in average particle diameter.

[Method for Producing Composite Resin Particles]

A method for producing the composite resin particles of the present invention comprises the steps of:

(A) dispersing, in an aqueous suspension containing a dispersant, particles of a polyolefin-based resin having at least two melting peaks in a differential scanning calorimetry (DSC) curve obtained by DSC; a styrene-based monomer; and 0.1 to 0.9 parts by mass of a polymerization initiator per 100 parts by mass of the styrene-based monomer;

(B) heating the resulting dispersion at a temperature at which the styrene-based monomer is not substantially polymerized and immersing the styrene-based monomer in the particles of the polyolefin-based resin; and (C) carrying out first polymerization of the styrene-based monomer at a temperature of T2 to (T2+35)° C., wherein T2° C. is the highest melting peak temperature among the melting peaks, or comprising, in addition to the steps (A) to (C), the step of:

(D) following the first polymerization, adding the styrene-based monomer and 0.1 to 0.9 parts by mass of a polymerization initiator per 100 parts by mass of the styrene-based monomer and carrying out immersion of the styrene-based monomer in the particles of the polyolefin-based resin and second polymerization at a temperature of (T1−10) to (T2+5)° C., wherein T1° C. is the lowest melting peak temperature among the melting peaks.

In the method for producing the composite resin particles of the present invention, a polyolefin resin having at least two melting peaks in a differential scanning calorimetry (DSC) curve obtained by DSC is used as a nucleating resin for seed polymerization and a styrene being immersed therein is polymerized under a specific temperature condition, and thus composite resin particles having both high impact resistance and high expandability can be obtained.

[Step (A)]

First of all, in an aqueous suspension containing a dispersant, polyolefin-based resin particles having at least two melting peaks in a differential scanning calorimetry (DSC) curve obtained by DSC, a styrene-based monomer and 0.1 to 0.9 parts by mass of a polymerization initiator per 100 parts by mass of the styrene-based monomer are dispersed.

(Polyolefin-Based Resin Particles)

A polyolefin-based resin (PO) which forms the polyolefin-based resin particles has at least two melting peaks in a differential scanning calorimetry (DSC) curve obtained by DSC.

For example, FIG. 1 is a DSC chart obtained by differential scanning calorimetry of a polyolefin-based resin (resin A of Example 1) and shows melting peak temperatures at 100° C. and 123° C.

Resin A in FIG. 1 has the highest melting peak temperature T2 among the melting peaks of 123° C. and the lowest melting peak temperature T1 among the melting peaks of 100° C.

It is desirable that the temperature difference between the melting peak temperature T2 and the melting peak temperature T1 is 10 to 50° C.

If the temperature difference is lower than 10° C., an inner morphology that includes a mixture of sea-island structure regions in which particles of the polystyrene-based resin are dispersed in the polyolefin-based resin and co-continuous structure regions in which the polystyrene-based resin having an indefinite shape is dispersed in the polyolefin-based resin may not be exhibited. On the other hand, if the temperature difference exceeds 50° C., thermal resistance or expandability of an expanded molded article may decrease.

The temperature difference (° C.) is, for example, 10, 15, 20, 25, 30, 35, 40 or 50.

The temperature difference is preferably 20 to 40° C.

The melting peak temperature T1 is preferably 90° C. or higher.

If the melting peak temperature T1 is lower than 90° C., thermal resistance of an expanded molded article may decrease.

The melting peak temperature T1 (° C.) is, for example, 90, 95, 100, 105, 110, 115, 120, 125 or 130.

It is desirable that the polyolefin-based resin has at least two crystallization peaks in the DSC curve among which a crystallization peak at the highest temperature has a maximum peak area.

For example, in FIG. 1 which is a differential scanning calorimetry (DSC) chart by DSC of a polyolefin-based resin (resin A of Example 1), crystallization peak temperatures are 85° C. and 112° C. and the area of the latter peak is maximum.

As the polyolefin-based resin (PO) forming the polyolefin-based resin particles, there are no particular limitations so long as such is a polyolefin-based resin having the above thermal properties. As examples of the polyolefin-based resin there may be mentioned resins obtained by a publicly known polymerization procedure and the resins may include cross-linked resins. As examples of the polyolefin-based resin there may be mentioned polyethylene-based resins such as branched low-density polyethylene, linear low-density polyethylene, medium-density polyethylene, high-density polyethylene, ethylene-vinyl acetate copolymers, ethylene-methyl methacrylate copolymers, ethylene-methyl acrylate copolymers and cross-linked polymers of the aforementioned polymers; and polypropylene-based resins such as propylene, ethylene-propylene random copolymers, propylene-1-butene copolymers, and ethylene-propylene-butene random copolymers. These low-density polyethylenes are preferably 0.90 to 0.94 g/cm$^3$ in density, more preferably 0.91 to 0.94 g/cm$^3$, and most preferably 0.91 to 0.93 g/cm$^3$ in density. More specifically, as examples of the polyolefin-based resin there may be mentioned commercialized products, as used in Examples.

As the polyolefin-based resin, it is preferable that the polyolefin-based resin contains a component selected from a polyethylene resin and an ethylene-acryl copolymer resin in view of impact resistance.

The polyolefin-based resin particles serve as core resin particles (hereinafter also referred to as "seed particles") and may be obtained by, for example, melting and kneading the polyolefin-based resin in an extruder and then extruding the polyolefin-based resin in the form of a strand and cutting the strand so as to have a desired particle diameter. When carbon black is used as a coloring agent described hereinbelow, it is desirable that carbon black is added and kneaded at this stage.

A resin extruding hole of a dice is desirably 0.2 to 1.0 mm in diameter to obtain a predetermined size of the nucleus resin particles. A resin pathway is desirably 2.0 to 6.0 mm in land length to maintain high dispersivity of the polystyrene-based resin and to retain a resin pathway inlet of the dice with 10 to 20 MPa of pressure, and a resin temperature of the resin extruded from the extruder is preferably adjusted to 200 to 270° C. at a dice inlet.

The desired nucleus resin particles are obtained by combining the screw-structured extruder, the dice, extrusion conditions, and underwater cutting conditions.

The nucleus resin particles may comprise additives such as a compatibilizing agent for the polyolefin-based resin and the polystyrene-based resin, a cell regulator and an antistatic agent, as long as the additives do not deteriorate any effects of the present invention.

A particle diameter of the nucleus resin particles may be properly adjusted according to the average particle diameter of the composite resin particles. The particle diameter ranges preferably from 0.4 to 1.5 mm and more preferably 0.4 to 1.0 mm. An average mass of the nucleus resin particles is 30 to 90 mg per 100 particles. Examples of a shape of the nucleus resin particles include sphere-shaped, oval-shaped (egg-shaped), cylindrical, and prismatic.

(Styrene-Based Monomer)

The styrene-based monomer is polymerized in the steps (C) and (D) and becomes 50 to 800 parts by mass of a polystyrene-based resin (PS) with respect to 100 parts by mass of the polyolefin-based resin.

The amount of the styrene-based monomer and the amount of the polystyrene-based resin obtained after polymerization are almost the same.

If the polystyrene-based resin is less than 50 parts by mass, capability of retaining a blowing agent in the expanded particles may decrease; high expandability may not be possible; and rigidity of an expanded molded article may decrease. On the other hand, if the polystyrene-based resin exceeds 800 parts by mass, the polystyrene-based resin may not be sufficiently immersed in the polyolefin-based resin particles inwardly and may be left in large quantity on a surface of the composite resin particles; therefore, an undesired result may be found such as white particles. Additionally, other undesired results include a decrease in crack resistance of an expanded molded article as well as a decrease in chemical resistance of the expanded molded article.

The polystyrene-based resin (parts by mass) is, for example, 100, 150, 200, 250, 300, 350, 400, 450, 500, 650, 700, 750 or 800 with respect to 100 parts by mass of the polyolefin-based resin.

The polystyrene-based resin is preferably 100 to 400 parts by mass with respect to 100 parts by mass of the polyolefin-based resin.

As the polystyrene-based resin, there are no particular limitations so long as such is a resin containing a styrene-based monomer as a main component used in the relevant technical field; and a homopolymer or a copolymer of styrene or a styrene derivative may be mentioned.

As styrene derivatives, α-methylstyrene, vinyl toluene, chlorostyrene, ethylstyrene, isopropylstyrene, dimethylstyrene, bromostyrene, and the like may be mentioned. These styrene-based monomers may be used alone or may be combined.

The polystyrene-based resin may be a resin that is combined with a vinyl-based monomer copolymerizable with a styrene-based monomer.

As the vinyl-based monomer, for example, multifunctional monomers such as divinylbenzenes such as o-divinylbenzene, m-divinylbenzene, and p-divinylbenzene, and alkylene glycol di(meth)acrylates such as ethylene glycol di(meth)acrylate and polyethylene glycol di(meth)acrylate; (meth)acrylonitrile; methyl (meth)acrylate; butyl (meth)acrylate; and the like may be mentioned. Among these, multifunctional monomers are preferable, ethylene glycol di(meth)acrylate, polyethylene glycol di(meth)acrylates in which the number of ethylene units is 4 to 16, and divinylbenzenes are more preferable, and divinylbenzenes and ethylene glycol di(meth)acrylate are particularly preferable. The vinyl monomers may be used alone or may be combined.

Also, when a vinyl monomer is used in combination, it is desirable that the content thereof is set so that the styrene-based monomer has an amount so as to become the main component (for example, 50% by mass or more).

In the present invention, "(meth)acryl" means "acryl" or "methacryl."

(Dispersant)

In the method for producing composite resin particles of the present invention, a dispersant (suspension stabilizer) is used in order to stabilize dispersion of styrene-based monomer droplets and nucleus resin particles. For such suspension stabilizer, there are no particular limitations so long as it has been conventionally used in the suspension polymerization of styrene-based monomers and, for example, water-soluble polymers such as polyvinyl alcohol, methyl cellulose, polyacrylamide, and polyvinyl pyrrolidone; poorly-soluble inorganic compounds such as tribasic calcium phosphate, hydroxyapatite, and magnesium Among these; and the like may be mentioned.

Also, when a poorly-soluble inorganic compound is used, normally an anionic surfactant is combined.

As such anionic surfactant, for example, fatty acid soap; N-acylamino acids or salts thereof; carboxylates such as alkyl ether carboxylates; sulfonates such as alkyl benzene sulfonates, alkyl naphthalene sulfonates, dialkyl sulfosuccinic acid ester salts, alkyl sulfoacetates, and α-olefin sulfonates; sulfuric acid ester salts such as higher alcohol sulfuric acid ester salts, secondary higher alcohol sulfuric acid ester salts, alkyl ether sulfates, and polyoxyethylene alkyl phenyl ether sulfates; phosphoric acid ester salts such as alkyl ether phosphoric acid ester salts and alkyl phosphoric acid ester salts; and the like may be mentioned.

(Polymerization Initiator)

For the polymerization initiator, there are no particular limitations so long as it is used in the art, and particularly has been conventionally used in the polymerization of styrene-based monomers and, for example, organic peroxides such as benzoyl peroxide, lauryl peroxide, t-butyl peroxybenzoate, t-butyl peroxy-2-ethylhexanoate, t-butyl peroxide, t-butyl peroxypivalate, t-butyl peroxyisopropylcarbonate, t-butyl peroxyacetate, 2,2-bis(t-butylperoxy)butane, t-butylperoxy-3,3,5-trimethylhexanoate, di-t-butylperoxyhexahydroterephthalate, 2,2-di-t-butylperoxybutane, di-t-hexylperoxide, and dicumyl peroxide; azo compounds such as azobisisobutyronitrile and azobisdimethylvaleronitrile; and the like may be mentioned. These may be used alone or in combination, but preferably multiple polymerization initiators whose decomposition temperature for obtaining a half-life of 10 hours is from 60 to 130° C. are used in combination.

The amount of addition of the polymerization initiator is 0.1 to 0.9 parts by mass per 100 parts by mass of the styrene-based monomer.

If the amount of addition of the polymerization initiator is less than 0.1 parts by mass, the composite resin particles may have extremely high molecular weight to decrease expandability. On the other hand, if the amount of addition of the polymerization initiator exceeds 0.9 parts by mass, the polymerization speed may be too high and particles of the polystyrene-based resin may not be able to control dispersion status in the polyolefin-based resin.

The amount of addition (parts by mass) of the polymerization initiator is, for example, 0.1, 0.2, 0.25, 0.3, 0.35, 0.4, 0.45, 0.5, 0.6, 0.7, 0.8 or 0.9 per 100 parts by mass of the styrene-based monomer.

The amount of addition of the polymerization initiator is preferably 0.2 to 0.5 parts by mass.

(Other Components)

The composite resin particles may comprise additives such as a coloring agent, a flame retardant, a flame-retardant auxiliary agent, a plasticizer, a binding inhibitor, a cell regulator, a crosslinking agent, a filler, a lubricant, a fusion accelerator, an antistatic agent and a spreader, as long as the additives do not deteriorate any physical properties.

As the coloring agent, carbon black such as furnace black, Ketchen black, channel black, thermal black, acetylene black, graphite and carbon fiber may be mentioned, which may be a master batch added to a resin.

The content of carbon black in the composite resin particles is preferably 1.5 to 5.0% by mass.

As the flame retardant, tri(2,3-dibromopropyl) isocyanate, bis[3,5-dibromo-4-(2,3-dibromopropoxy) phenyl] sulfone, tetrabromocyclooctane, hexabromocyclododecane, trisdibromopropylphosphate, tetrabromobisphenol A, tetrabromobisphenol A-bis(2,3-dibromo-2-methylpropyl ether), tetrabromobisphenol A-bis(2,3-dibromopropyl ether) and the like may be mentioned.

As the flame-retardant auxiliary agent, organic peroxides such as 2,3-dimethyl-2,3-diphenyl butane, 3,4-dimethyl-3,4-diphenyl hexane, dicumyl peroxide and cumene hydroperoxide may be mentioned.

The contents of the flame retardant and the flame-retardant auxiliary agent in the composite resin particles are preferably 1.0 to 5.0% by mass and 0.1 to 2.0% by mass, respectively.

It is particularly desirable that the composite resin particles of the present invention as well as expanded particles obtained by immersing a blowing agent therein and pre-expanding thereof, further comprise, as the flame retardant, 1.5 to 6.0 parts by mass of tri(2,3-dibromopropyl) isocyanate or bis[3,5-dibromo-4-(2,3-dibromopropoxy) phenyl] sulfone with respect to 100 parts by mass of the expanded particles and, as the flame-retardant auxiliary agent, 0.1 to 2.0 parts by mass of 2,3-dimethyl-2,3-diphenyl butane with respect to 100 parts by mass of the expanded particles.

Examples of how to add the flame retardant and the flame-retardant auxiliary agent include adding the flame retardant and the flame-retardant auxiliary agent to a suspension of the composite resin particles while being stirred and mixed during heating as will be described in the step (E) and Examples below.

The composite resin particles may comprise the plasticizer whose boiling point exceeds 200° C. at 1 atm so as to maintain good expanding moldability even if a pressure of steam is low at the time of the heating and expanding.

As the plasticizer, phthalic acid esters; glycerin fatty acid esters such as glycerin diacetomonolaurate, glycerin tristearate, and glycerin diacetomonostearate; adipic acid esters such as diisobutyl adipate; coconut oil; and the like may be mentioned.

The content of the plasticizer in the composite resin particles is desirably 0.1 to 3.0% by mass.

As the binding inhibitor, calcium carbonate, silica, zinc stearate, aluminum hydroxide, ethylene bis-stearic acid amide, tribasic calcium phosphate, dimethyl silicone, and the like may be mentioned.

As the cell regulator, ethylene bis stearamide, polyethylene wax, and the like may be mentioned.

As the crosslinking agent, organic peroxides such as 2,2-di-t-butyl peroxybutane, 2,2-bis(t-butylperoxy)butane, dicumyl peroxide, 2,5-dimethyl-2,5-di-t-butyl peroxyhexane, and the like may be mentioned.

As the filler, synthetic or naturally-produced silicon dioxide and the like may be mentioned.

As the lubricant, paraffin wax, zinc stearate, and the like may be mentioned.

As the fusion accelerator, stearic acid, stearic acid triglycerides, hydroxystearic acid triglycerides, stearic acid sorbitan esters, polyethylene wax, and the like may be mentioned.

As the antistatic agent, polyoxyethylene alkylphenol ethers, stearic acid monoglycerides, polyethylene glycol, and the like may be mentioned.

As the spreader, polybutene, polyethylene glycol, silicone oil, and the like may be mentioned.

(Stirring)

It is desirable that stirring conditions are adjusted in such a way that a stirring required power (Pv) required to stir 1 m$^3$ of the aqueous medium is 0.06 to 0.8 kw/m$^3$ that comprises the nucleus resin particles and the styrene-based monomer and optionally comprises a disperse material and a dissolved material. The stirring required power is preferably 0.1 to 0.5 kw/m$^3$. This stirring required power corresponds to energy per net unit volume at the time of stirring the contents in a reaction container.

The stirring required power may be measured as follows.

More specifically, the aqueous medium comprising the nucleus resin particles and the styrene-based monomer and optionally comprising the disperse material and the dissolved material is supplied into a polymerization vessel installed in a polymerization apparatus and is stirred while a stirring blade rotates at the predetermined number of revolutions. In this case, a revolution drive load required to rotate the stirring blade is measured as a current value $A_1$ (ampere). This current value $A_1$ is multiplied by an effective voltage (volt) to obtain a value $P_1$ (watt).

The stirring blade of the polymerization apparatus is rotated in the empty polymerization vessel at the same number of revolutions as above, and a revolution drive load required to rotate the stirring blade is measured as a current value $A_2$ (ampere). This current value $A_2$ is multiplied by an effective voltage (volt) to obtain a value $P_2$ (watt) so as to calculate a stirring required power according to the following formula. It should be noted that V (m$^3$) indicates an entire volume of the aqueous medium comprising the nucleus resin particles and the styrene-based monomer and optionally comprising the disperse material and the dissolved material.

$$\text{Stirring required power } (Pv) = (P_1 - P_2)/V$$

As a shape and a structure of the polymerization vessel, there are no particular limitations so long as such has been conventionally used for the polymerization of styrene-based monomers.

As the stirring blade, there are no particular limitations as long as the stirring required power is configurable within a predetermined range.

More specifically, examples of the stirring blade include paddle blades such as a V-type paddle blade, a pitched paddle blade, a flat paddle blade, a Pfaudler blade and a pull margin blade; turbine blades such as a turbine blade and a fan turbine blade; and propeller blades such as a Marin propeller blade. Of these stirring blades, the paddle blades are preferable; and more preferably the V-type paddle blade, the pitched paddle blade, the flat paddle blade, the Pfaudler blade and the pull margin blade. The stirring blade may be either a single-stage blade or a multistage blade.

As regards a size of the stirring blade, there are no particular limitations as long as the stirring required power is configurable within a predetermined range.

Moreover, the polymerization vessel may be provided with a baffle plate (baffle).

[Step (B)]

Next, the obtained dispersion is heated to a temperature at which the styrene-based monomer does not substantially polymerize and the styrene-based monomer is immersed in the polyolefin-based resin particles.

(Heating)

The temperature at which the styrene-based monomer does not substantially polymerize may be properly set according to types of the raw material resins and the formulation ratio thereof and physical properties of expanded particles to be produced. This temperature is normally from 45 to 80° C.

A suitable time to immerse the styrene-based monomer in the polyolefin-based resin particles is 30 minutes to 2 hours. If the polymerization progresses before the styrene-based monomer is sufficiently immersed in the polyolefin-based resin particles, polystyrene polymer powder may be formed.

[Step (C)]

The styrene-based monomer is then subjected to first polymerization at a temperature of T2 to (T2+35)° C., in which T2° C. is the highest melting peak temperature among the melting peaks.

If the melting temperature is lower than T2° C., the obtained resin particles may contain less polystyrene-based resin in the central part of the resin particles, with the result that resin particles and an expanded molded article having good mechanical properties may not be obtained. On the other hand, if the polymerization temperature exceeds (T2+35)° C., the styrene-based monomer may start polymerizing before being sufficiently immersed in the polyolefin-based resin particles, with the result that resin particles and an expanded molded article having good mechanical properties may not be obtained.

In cases where a melting peak temperature T2 of the polyolefin-based resin is, for example, 123° C., the polymerization temperature is from 123 to 158° C.

A polymerization time is normally in the order of 1 to 6 hours, and preferably 1.5 to 3 hours in consideration of quality and productivity of composite resin particles to be produced.

A pressure in the system at the time of the polymerization is normally in the order of 0.05 to 0.5 MPa, and preferably 0.1 to 0.3 MPa in consideration of safeness of the polymerization in terms of stability operations.

Additionally, a heating-up period or a cooling-down period to reach a preset temperature in each step changes depending on an ambient temperature; however, a suitable rate to reach the preset temperature is 0.3° C./min. to 3.0° C./min. on the basis of the entire period from the initiation temperature to the purposive temperature.

Especially, if a rate of temperature increase is too fast, the styrene-based monomer may start polymerizing before the styrene-based monomer is sufficiently immersed in the polyolefin-based resin particles; and resin particles and an expanded molded article having good blackness and mechanical properties may not be obtained. On the other hand, if a rate of temperature increase is too slow, the process may become too long, leading to high production costs. The rate is desirably 0.4° C./min. to 2.5° C./min.

Other polymerization conditions may be properly adjusted according to composition of composite resin particles to be produced.

[Step (D)]

The method for producing the composite resin particles of the present invention comprises steps (A) to (C) as described above or further comprises the following step (D).

Following the first polymerization, the styrene-based monomer and 0.1 to 0.9 parts by mass of a polymerization initiator per 100 parts by mass of the styrene-based monomer are added and the styrene-based monomer is immersed in the polyolefin-based resin particles and second polymerization is carried out at a temperature of (T1−10) to (T2+5)° C., in which T1° C. is the lowest melting peak temperature among the melting peaks.

This step is different from the steps (B) and (C) in that polymerization is carried out while the monomer is absorbed in nucleus resin particles, and thus is a modification of the steps (B) and (C) and corresponds to the repetition of the steps, hence the two-stage polymerization step.

The step (D), namely immersion of the styrene-based monomer in the polyolefin-based resin particles and polymerization, may be optionally repeated.

The amount of the styrene-based monomer used per polymerization including the steps (B) and (C) may be appropriately divided so that the mass proportion of the polyolefin-based resin and the polystyrene-based resin is as described above. The amount of addition of the polymerization initiator is as same as in the step (A).

If the polymerization temperature is lower than (T1−10)° C., the sea-island structure in which particles of the polystyrene-based resin are dispersed in the polyolefin-based resin may be reduced, and thus impact resistance may be insufficient which is characteristic of the sea-island structure. On the other hand, if the polymerization temperature exceeds (T2+5)° C., the co-continuous structure in which particles having indefinite shapes are dispersed may be reduced and expandability may not be exhibited which is characteristic of the co-continuous structure.

In cases where melting peak temperatures T1 and T2 of the polyolefin-based resin are, for example, 100° C. and 123° C., respectively, the polymerization temperature is from 90 to 128° C.

The polymerization temperature is preferably (T1−10) to T2° C.

[Annealing Step]

After the step (D) or the step (C) when the step (D) is not carried out, it is desirable that annealing is carried out at a temperature of T2 to T2+20° C. A time of annealing is normally in the order of 1 to 6 hours, and preferably 2 to 4 hours in consideration of quality and productivity of composite resin particles to be produced.

The reason why annealing is required is hereinafter described.

During the steps before the annealing step, the styrene-based monomer and the polymerization initiator absorbed in the nucleus resin particles have not completed the reaction, and thus more than a little amount of unreacted substances are present in the composite resin particles. Because of this, when an expanded molded article is obtained by using composite resin particles without annealing, problems may result such as reduction of mechanical properties and thermal resistance of the expanded molded article and an odor caused by volatile unreacted substances because of low molecular weight unreacted substances such as the styrene-based monomer. By introducing the annealing step, the time is secured in which unreacted substances polymerize, thereby removing the remaining unreacted substances so that physical properties of the expanded molded article are not affected.

[Expandable Particles]

The expandable particles of the present invention are obtained by immersing a blowing agent in the composite resin particles of the present invention by a publicly known method.

Low temperatures may require a time to immerse the blowing agent in the composite resin particles and may deteriorate production efficiency of the expandable particles, while high temperatures may cause cohesion of the expandable particles significantly; therefore, a temperature at which the blowing agent is immersed in the composite resin particles is preferably 50 to 130° C. and more preferably 60 to 100° C.

(Blowing Agent)

As the blowing agent, a volatile blowing agent is desirable; and there are no particular limitations so long as such has been conventionally used in the expansion of polystyrene-based resins. As examples of the volatile blowing agent there may be mentioned aliphatic hydrocarbons having 5 or less carbons such as isobutane, n-butane, isopentane, n-pentane and neopentane. In particular, butane-based blowing agents and pentane-based blowing agents are preferable. It can be expected that pentane will act as a plasticizer.

The content of the blowing agent in the expandable composite resin particles is normally in the range of from 2 to 10% by mass; however, preferably in the range of from 3 to 10% by mass and particularly preferably in the range of from 3 to 8% by mass.

If the content of the blowing agent is low, for example, less than 2% by mass, a low-density expanded molded article may not be obtainable from the expandable particles; and since an effect of increasing a secondary expansion force cannot be achieved at the time of the expansion molding in the cavity, an appearance of an expanded molded article may deteriorate. On the other hand, if the content of the blowing agent is high, for example, exceeding 10% by mass, the time required for the cooling step in the production process of an expanded molded article using the expandable particles may increase, leading to low productivity in some situations.

(Blowing Auxiliary Agent)

The expandable particles may comprise a blowing auxiliary agent together with the blowing agent.

As the blowing auxiliary agent, there are no particular limitations so long as such has been conventionally used in the expansion of polystyrene-based resins. For example, aromatic organic compounds such as styrene, toluene, ethylbenzene, and xylene; cyclic aliphatic hydrocarbons such as cyclohexane and methylcyclohexane; and solvents having a boiling point of 200° C. or lower at 1 atm such as ethyl acetate and butyl acetate may be mentioned.

The content of the blowing auxiliary agent in the expandable particles is normally in the range of from 0.3 to 2.5% by mass and preferably 0.5 to 2% by mass.

If the content of the blowing auxiliary agent is low, for example, less than 0.3% by mass, a plasticization effect of the polystyrene-based resin may not be exhibited. On the other hand, if the content of the blowing auxiliary agent is high, for example, exceeding 2.5% by mass, an appearance of an expanded molded article to be obtained by expanding the expandable particles may deteriorate because of shrinkage and melting occurring to the expanded molded article, or the time required for the cooling step in the production process of the expanded molded article using the expandable particles may increase.

(Expandability)

The expandable particles of the present invention have both high impact resistance and high expandability, and the expandability thereof is preferably such that the expanded particles have an expansion ratio (bulk expansion ratio) of 60 or higher. How to evaluate the expandability will be detailed in Examples.

[Expanded Particles]

The expanded particles of the present invention are obtained by pre-expanding the expandable particles of the present invention, more specifically, by heating and pre-expanding the expandable particles of the present invention in a sealed container by introducing a gauge pressure 0.004 to 0.09 MPa of steam so as to obtain the expanded particles having a predetermined bulk density.

As examples of this procedure there may be mentioned batch-type expansion and continuous expansion that introduce steam, and emission expansion carried out under pressure; and air may be introduced as needed together with the steam during the expansion.

(Bulk Density)

The expanded particles of the present invention preferably have a bulk density of 15 to 200 kg/m$^3$. If the bulk density of the expanded particles is lower than 15 kg/m$^3$, an expanded molded article is likely to shrink; its appearance may deteriorate; and its mechanical strength may become insufficient. On the other hand, if the bulk density of the expanded particles exceeds 200 kg/m$^3$, merit in reducing weight of an expanded molded article may deteriorate.

The bulk density (kg/m$^3$) of the expanded particles is, for example, 15, 20, 25, 30, 35, 40, 45, 50, 55, 60, 65, 70, 75, 80, 85, 90, 95, 100, 110, 120, 130, 140, 150, 160, 170, 180, 190 or 200. The expanded particles are preferably 20 to 100 kg/m$^3$ in bulk density. How to measure the bulk density will be detailed in Examples.

(Average Particle Diameter)

The expanded particles of the present invention preferably are 0.5 to 8.0 mm in average particle diameter. If the average particle diameter of the expanded particles is less than 0.5 mm, expandability may decrease; and surface stretching of an expanded molded article may worsen, at the time of expanding and molding an article. On the other hand, if the average particle diameter of the expanded particles exceeds 8.0 mm, filling property of the expanded particles may become insufficient at the time of molding and processing an article.

The average particle diameter (mm) of the expanded particles is, for example, 0.5, 1.0, 1.5, 2.0, 2.5, 3.0, 3.5, 4.0, 4.5, 5.0, 5.5, 6.0, 6.5, 7.0, 7.5 or 8.0.

The expanded particles are more preferably 1.5 to 7.0 mm in average particle diameter.

[Expanded Molded Article]

The expanded molded article of the present invention is obtained by expanding and molding the expanded particles of the present invention in a cavity.

More specifically, the expanded molded article is obtained by a publicly known method such that a mold (cavity) of a foam molding machine is fed with the expanded particles; and the expanded particles are heated again so that the particles are expanded and thermally fused.

(Density)

It is desirable that the expanded molded article of the present invention has a density of 15 to 200 kg/m$^3$. If the density of the expanded molded article is lower than 15 kg/m$^3$, impact resistance may become insufficient. On the other hand, if the density of the expanded molded article exceeds 200 kg/m$^3$, the expanded molded article would have a limited effect of being lightweight.

The density (kg/m$^3$) of the expanded molded article is, for example, 15, 20, 25, 30, 35, 40, 45, 50, 55, 60, 65, 70, 75, 80, 85, 90, 95, 100, 110, 120, 130, 140, 150, 160, 170, 180, 190 or 200. The expanded molded article is preferably 20 to 100 kg/m$^3$ in bulk density. How to measure the density will be detailed in Examples.

(Falling Ball Impact Strength)

The expanded molded article of the present invention has excellent impact resistance and has, for example, a falling ball impact strength in the range of 40 to 60 cm.

The falling ball impact strength is measured according to the method described in JIS K7211:1976 "General rule for determination of falling weight impact behavior of rigid plastics", and how to measure the falling ball impact strength will be detailed in Examples.

(Fusion Ratio)

The expanded molded article of the present invention has a fusion ratio of, for example, in the range of 80 to 100%. How to measure the fusion ratio will be detailed in Examples.

(Application)

The expanded molded article of the present invention may be used for various applications. Examples of the application include core materials of bumpers, automotive interior trims, electronic components, various industrial materials including glass, shock-absorbing materials for food products, transportation containers and the like. Particularly, the expanded molded article of the present invention has high impact resistance, and thus can be suitably used for, among the applications described above, automotive interior trims which are particularly required to have an impact absorbing ability.

The term "automobile" as used herein means a vehicle which is equipped with a motor, a steering mechanism and the like and thereby can travel on the earth while boarding. The term includes a vehicle connected to a wiring such as a trolleybus; however, the term does not include a vehicle which travels on rails even though the rails are on the earth.

The expanded molded article of the present invention may be used as an automotive interior trim, and thus preferably has a low burning rate. More specifically, the expanded molded article of the present invention is 80 mm/min or less in burning rate measured by the burning rate test method according to Federal Motor Vehicle Safety Standards of US (FMVSS 302).

How to measure the burning rate will be detailed in Examples.

An automotive interior trim comprising the expanded molded article of the present invention has excellent chemical resistance, impact strength and slow-burning properties and expanding moldability. Therefore, it is possible to provide an automotive interior trim which is low in cost, is light weight and has a strength and impact energy absorbing ability that can sufficiently satisfy protection of passengers upon collision.

Examples of applications of the automotive interior trim for which the present invention may be applied include the inner surface of doors, door trims, the lower surface of ceilings, rear packages, knee bolsters, air bag doors, head rests, arm rests, various types of pillars, quarter trims, front side trims, front seat backs, crush pads, console boxes, console lids, luggage floor covers, partition boards, center consoles, lids of console boxes and the like.

In order to apply for the applications, the expanded article may have a skin layer. As the skin layer, a resin layer such as a polyolefin non-expanded layer may be mentioned. The skin layer may be subjected to the treatment such as embossing and printing for the purpose of an improvement in the appearance.

EXAMPLES

In the following, the present invention will be explained in detail through Examples and Comparative Examples. However, the following Examples are merely the exemplifications of the present invention and the present invention should not be limited only to these Examples.

In the Examples and the Comparative Examples, the starting material resin and the obtained composite resin particles, expandable particles, expanded particles and expanded molded article were evaluated as follows.

<Density of Polyolefin-Based Resin>

The density (kg/m$^3$) is measured by the density gradient tube method according to JIS K6922-1:1998.

<MFR of Polyolefin-Based Resin>

MFR (g/10 min) is measured according to JIS K6922-1: 1998 at 190° C. under a load of 2.16 kg.

<Melting Point of Polyolefin Resin>

The melting point (° C.) is measured by the method described in JIS K7122:1987 "Testing methods for heat of transitions of plastics". Namely, on a differential scanning calorimeter type RDC220 (manufactured by Seiko Electronic Industries), 7 mg of a sample is filled in a measurement container, and heating, cooling and heating are repeated between room temperature and 220° C. with the heating and cooling rate of 10° C./L under a nitrogen gas flow of 30 mL/min. A melting peak temperature of the DSC curve upon second heating is indicated as a melting point. When there are two or more melting peaks, the temperature of the peak at the lowest temperature is indicated as a melting point (see FIG. 1).

<Vicat Softening Point of Polyolefin Resin>

The Vicat softening point (° C.) is measured according to JIS K7206:1999.

<Melting Peak and Crystallization Peak of Polyolefin Resin>

The melting point is measured by the method described in JIS K7122:1987 "Testing methods for heat of transitions of plastics".

Namely, an aluminum measurement container is filled with about 6 mg of a test piece at its bottom without having any space, and the test piece is measured by using a differential scanning calorimeter type DSC6220 (manufactured by SII Nano Technology, Inc.) under the following temperature conditions: a temperature is decreased from 30° C. to −40° C. at a nitrogen gas flow rate of 20 mL/min.; the temperature is retained for 10 min. and then is increased from −40° C. to 220° C. (1st heating); the temperature is retained for 10 min. and then is decreased from 220° C. to −40° C. (cooling); and the temperature is retained for 10 min. and then is increased from −40° C. to 220° C. (2nd heating) to obtain a DSC curve. All the heating processes and the cooling processes are carried out at a rate of 10° C./min., and alumina is used as a reference material.

In the present invention, the temperature of the top of a melting peak during the 2nd heating is indicated as a melting point by using an analysis software attached to the device. When there are two or more melting peaks, the temperature from each peak indicates a melting point.

<Morphology of Composite Resin Particles>

A section is excised from composite particles. The section is embedded in an epoxy resin and then an ultra-thin section (thickness: 70 nm) is prepared by using an ultramicrotome (manufactured by Leica Microsystems, "LEICA ULTRA-CUT UCT"). The ultra-thin section is then photographed on a transmission electron microscope (manufactured by Hitachi High-Technologies Corporation, "H-7600", a camera system "ER-B" manufactured by AMT) to observe the surface layer and inner cross-section structures of the particles. As the inner part of the particles, the portion which is 200 to 300 μm inside from the surface layer is observed. A dye upon preparation of the ultra-thin section is ruthenium tetroxide.

<Number of Dispersed PS Particles, Average of PS Dispersed Areas, Standard Deviation of the Number of PS Dispersed Particles, Maximum of the Areas of PS Dispersed Particles and Coefficient of Variation in PS Dispersion>

The region of 437.584 μm$^2$ of the portion 200 to 300 μM inside from the surface layer of the plane of section is photographed on a transmission electron microscope (TEM) at a magnification of 1000 of the transmission electron microscope itself. The obtained TEM photograph (TEM image) is subjected to a binarization using an image processing software (manufactured by Nanosystems, Nano Hunter NS2K-Pro) in order to differentiate the PS portions and the PE portions in the photograph. The binarized figure (binarized image) is automatically calculated to measure the number of PS dispersed particles, the average of PS dispersed areas (μm$^2$), the standard deviation of the number of PS dispersed particles (μm$^2$), the maximum of the areas of PS dispersed particles (μm$^2$) and the coefficient of variation in PS dispersion (%) of the polystyrene-based resin component.

Binarization and automatic calculation are more specifically carried out according to the following procedures.

(1) Scale setting: 1 pixel=0.018349 (μm)
(2) Region setting (rectangular): region=(0,0)–(1274, 1022)
(3) Smoothing filter: 3×3, 8 neighborhoods, processing=1 time
(4) NS method binarization: darker than background, color definition=25, sensitivity=10, noise removal
Concentration range=0 to 255
(5) Black/white inversion
(6) Image selection according to the amount of characteristic (area)
Delete only (0.000000 to 0.050000 μm$^2$), 8-neighborhood
(7) Area measurement: 8-neighborhood The composite resin particles of the present invention give the values satisfying all requirements as indicated below.

The number of PS dispersed particles is 180 or more;
the maximum of the areas of PS dispersed particles is 200 μm$^2$ or less; and
the coefficient of variation in PS dispersion is 100% or more.

<Evaluation of Expandability of Expandable Particles>

The mass (a) of about 2 g of expandable particles is accurately weighed to two places of decimals. The accurately measured expandable particles are placed in a container which is then placed in an expansion vessel which is confirmed to be at a temperature of 80° C. or lower. By introducing a gauge pressure 0.07 MPa of steam (temperature of steam: 99° C.), heat expansion is carried out at 90 to 100° C. The expansion ratio was measured immediately after removing the particles from the expansion vessel after 3 minutes of heating time. The heating time starts when the temperature in the expansion vessel reached 90° C. As the expansion ratio, the bulk expansion ratio of the expanded particles is determined by measuring the volume of about 2 g (a) of the expanded particles in a measuring cylinder and dividing the volume by (a). Based on the obtained bulk expansion ratio, evaluation is carried out according to the following standards.

Bulk expansion ratio of 60 or more: ○ (good)

Bulk expansion ratio of 50 or more and less than 60: Δ (acceptable)

Bulk expansion ratio of less than 50: x (not acceptable)

<Bulk Density of Expanded Particles>

The bulk density (kg/m³) of the expanded particles is measured as follows.

Expanded particles are filled in a measuring cylinder up to a scale of 500 cm³. Filling is finished when the measuring cylinder is visually observed from the horizontal direction and even only one expanded particle reached to the scale of 500 cm³. Then the mass of the expanded particles filled in the measuring cylinder is accurately weighed to two places of decimals and from the mass W (g), the bulk density of the expanded particles is calculated.

Bulk density of expanded particles (kg/m³)=W/500×1000

<Density of Expanded Molded Article>

The mass (a) and volume (b) of a test piece (for example, 75×300×35 mm) excised from an expanded molded article (obtained after drying at 50° C. for 4 hours or more following molding) are measured to three places of decimals and the density (kg/m³) of the expanded molded article is determined from the formula (a)/(b).

<Falling Ball Impact Strength of Expanded Molded Article>

A falling ball impact strength (cm) is measured according to the method described in JIS K7211:1976 "General rule for determination of falling weight impact behavior of rigid plastics".

After drying the obtained expanded molded article having an expansion ratio of 40 at a temperature of 50° C. over 1 day, a test piece (no skin layer for all 6 planes) of 40 mm×215 mm×20 mm (thickness) is excised from the expanded molded article.

Next, the test piece is fixed with a clamp at both ends so that the gap between the supporting points is 150 mm and a rigid sphere having a weight of 321 g is allowed to fall at a central part of the test piece from a predetermined height, followed by observation of the presence or absence of a breakage on the test piece.

The test is carried out by varying the height (test height) from which the rigid sphere is allowed to fall from the minimum height at which all 5 test pieces break to the maximum height at which no test piece breaks with an interval of 5 cm and the falling ball impact strength (cm), namely the height at 50% breakage is calculated according to the following calculation formula:

$$H50 = Hi + d[\Sigma(i \cdot ni)/N \pm 0.5]$$

In the formula, the symbols signify the followings:

H50: height at 50% breakage (cm);

Hi: the test height (cm) at which the height level (i) is 0 and at which a test piece is supposed to break;

d: the interval (cm) of the height when varying the test height;

i: the height level which starts from 0 when the height level is Hi and increases/decreases by 1 (i= . . . −3, −2, −1, 0, 1, 2, 3 . . . );

ni: the number of test pieces broken or not broken at each level, whichever the more (when the number is the same for broken test pieces and unbroken test pieces, either may be used);

N: the total number (N=Σni) of test pieces broken or not broken, whichever the more (when the number is the same for broken test pieces and unbroken test pieces, either may be used); and ±0.5: the negative number is used when the data for broken test pieces is used and the positive number is used when the data for unbroken test pieces is used.

The obtained falling ball impact strength is evaluated according to the following standards:

○ (good): the falling ball impact strength is 45 cm or more;

Δ (acceptable): the falling ball impact strength is in the range of 40 cm or more and less than 45 cm;

x (not acceptable): the falling ball impact strength is less than 40 cm.

<Chemical Resistance of Expanded Molded Article>

A plate-shaped test piece having a rectangular plane shape of 100 mm long×100 mm wide×20 mm thick is excised from an expanded molded article and is left to stand under the conditions of a temperature of 23° C. and humidity of 50% for 24 hours. The test piece is excised from the expanded molded article so that the whole upper surface of the test piece is formed by the skin layer of the expanded molded article. Next, 1 g of gasoline is uniformly applied on the upper surface of the test piece and the test piece is left to stand under the conditions of a temperature of 23° C. and humidity of 50% for 60 minutes. Thereafter, the chemical is wiped off from the upper surface of the test piece which is then visually observed to judge the chemical resistance according to the following standards:

○ (good): no change

Δ (acceptable): softened surface x (not acceptable): depressed surface (shrinkage)

<Fusion Ratio of Expanded Molded Article>

The upper surface of the expanded molded article is scored with a cutter along the lateral direction with the line of 300 mm long and about 5 mm depth and the expanded molded article is fractioned into two along the score. For the expanded particles on the fracture surface of the fractioned expanded molded article, the number (a) of expanded particles fractured inside thereof and the number (b) of expanded particles fractured at the boundary face between the expanded articles are measured and the fusion ratio (%) is calculated based on the following formula:

$$\text{Fusion ratio (\%)}=100\times(a)/[(a)+(b)]$$

<Burning Rate of Expanded Molded Article>

The burning rate is measured by the method according to Federal Motor Vehicle Safety Standards of US (FMVSS 302).

The test piece is 350 mm×100 mm×12 mm (thickness) and has skin layers on at least two planes of 350 mm×100 mm.

The burning rate is evaluated according to the following standards:

○ (good): the expanded molded article having a predetermined density which has a burning rate of less than 80 mm/min, or the expanded molded article having a predetermined density for which fire is extinguished before reaching to the measurement starting point. In the latter case, the burning rate is indicated as 0 mm/min (auto-extinguishing: AE).

x (not acceptable): the expanded molded article having a predetermined density which has a burning rate of 80 mm/min or more.

Example 1

(Preparation of Nucleus Resin Particles)

100 parts by mass of linear low-density polyethylene-based resin (density: 937 kg/m³, MFR: 1.8 g/10 min, melting point: 127° C.; manufactured by Prime Polymer Co., Ltd.; brand name: Evolue SP 4020) and 67 parts by mass of an ethylene-ethyl acrylate copolymer (an ethylene copolymer, MFR: 0.4 g/10 min, melting point: 104° C., Vicat softening point: 83° C., content of the component derived from ethylene-ethyl acrylate: 10% by mass; manufactured by Japan Polyethylene Corporation, brand name: Rexpearl A1100) were poured into a tumbler mixer and mixed for 10 min.

The obtained resin mixture (resin A) was then supplied into an extruder (manufactured by Toshiba Machine Co., Ltd.; model No.: SE-65) and was heated and melted at 230 to 250° C. to be extruded in the form of granulated pellets and cut into oval spheres (egg shape) by an underwater cutting method to obtain linear low-density polyethylene-based resin particles (seed particles). The linear low-density polyethylene-based resin particles had an average mass of 0.6 mg.

FIG. 1 shows a differential scanning calorimetry (DSC) chart obtained by DSC of the polyolefin-based resin (resin A).

(First Polymerization)

In a 5-liter autoclave equipped with a stirrer (manufactured by Nitto Kouatsu), 40 g of magnesium pyrophosphate as a dispersant and 0.6 g of sodium dodecyl benzenesulfonate as a surfactant were dispersed in 2 kg of pure water to obtain a dispersing medium. In the dispersing medium was dispersed 600 g of the seed particles at 30° C., retained for 10 min and heated to 60° C. to obtain a suspension.

Then, 300 g of styrene, in which 0.6 g of dicumyl peroxide was already dissolved as a polymerization initiator, was added dropwise to the obtained suspension over 30 min. The mixture was retained for 30 minutes after dropwise addition to immerse styrene in the seed particles. After immersion, the reaction mixture was then heated to 140° C. to allow polymerization (first polymerization) at the same temperature for 2 hours.

(Second Polymerization)

Then, a dispersion which was already prepared by dispersing 3 g of sodium dodecyl benzenesulfonate in 20 g of pure water was added dropwise over 10 min to the suspension which was cooled to 115° C. Thereafter, 1100 g of styrene, in which 4 g of t-butyl peroxybenzoate was already dissolved as a polymerization initiator, was added dropwise over 4.5 hours to allow polymerization (second polymerization). After dropwise addition, annealing was carried out for 1 hour at the second polymerization temperature (115° C.) to process unreacted substances. After annealing, the reaction solution was heated to 140° C. and retained at the same temperature for 3 hours to further process unreacted substances to give 2000 g of composite resin particles (mass ratio between seed particles and polystyrene: 30/70).

Figure 2:
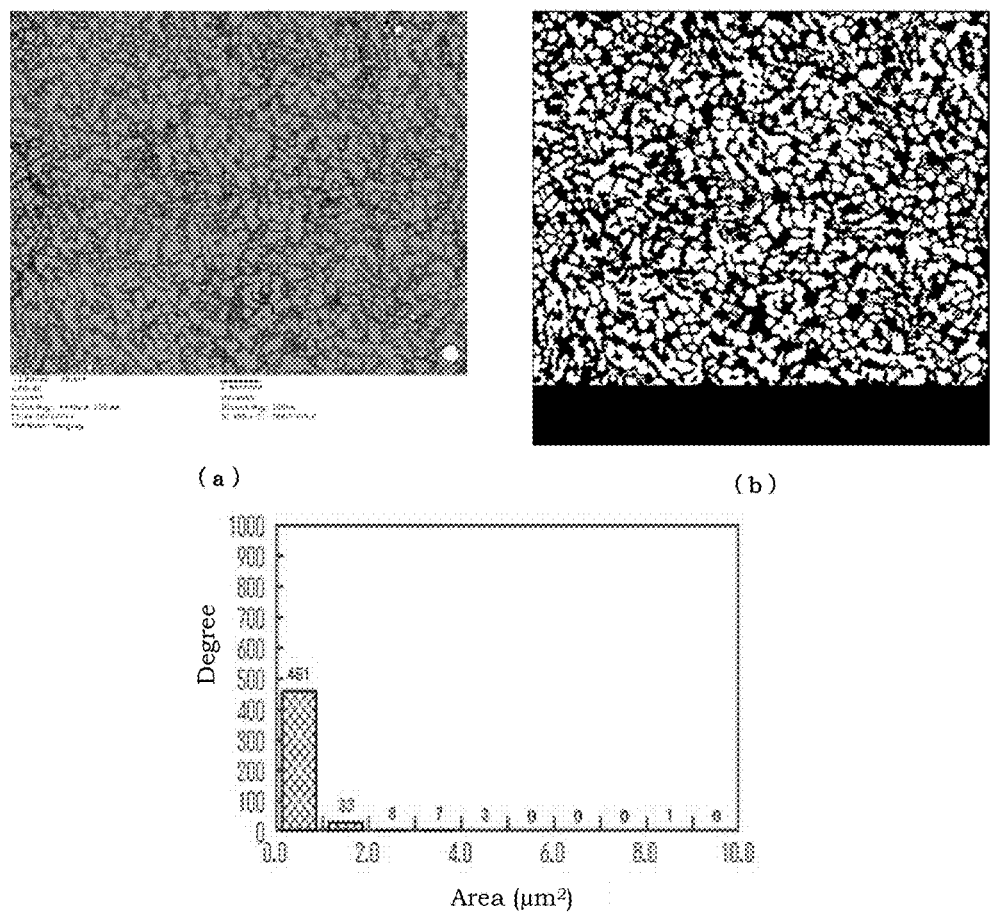
FIG. 2 exhibits (a) a TEM image and (b) a binarized image of cross-sections of composite resin particles of Example 1 and (c) the result of image analysis thereof (the area and degree of dispersed particles of the polystyrene-based resin).

FIG. 2 shows (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

(Flame-Retardant Process)

The reaction system was then brought to 60° C. and to the suspension were added 50 g of tris(2,3-dibromopropyl) isocyanurate (manufactured by Nippon Kasei Chemical Co., Ltd.) as a flame retardant and 10 g of dicumyl peroxide as a flame-retardant auxiliary agent. After addition, the reaction system was heated to 130° C. and was retained at the same temperature for 2 hours while being stirred to give 2060 g of frame retardant-containing composite resin particles.

(Preparation of Expandable Particles)

The reaction solution was then cooled to 30° C. or lower and the composite resin particles were taken out from the autoclave.

In a 5-liter autoclave equipped with a stirrer were poured 2 kg of the obtained composite resin particles, 2 liters of water and 2.0 g of sodium dodecyl benzenesulfonate as a surfactant. As a blowing agent, 300 g (520 mL, 15 parts by mass with respect to 100 parts by mass of the composite resin particles) of butane (n-butane:i-sutane=7:3) was added to the autoclave. After addition, the mixture was heated to 70° C. and was retained at the same temperature for 4 hours while being stirred to give 2200 g of expandable particles.

The expandable particles were then cooled to 30° C. or lower, taken out from the autoclave and dried.

(Preparation of Expanded Particles)

The obtained expandable particles were then examined for expandability and 1 kg of the expandable particles was poured into a pre-expansion machine having a tin volume of 40 liters (manufactured by Kasahara Industry Co., Ltd.; model No.: PSX40), and a gauge pressure 0.04 MPa of steam was introduced into the tin so as to heat and pre-expand to obtain expanded particles having a bulk density of 25 kg/m$^3$.

(Preparation of an Expanded Molded Article)

The obtained expanded particles were then left 1 day at room temperature (23° C.) and filled into a molding cavity having a cavity with an inside dimension of 400 mm×300 mm×30 mm.

To the molding cavity was introduced 0.09 MPa of steam for 20 seconds and then the molding cavity was cooled until the expanded molded article having 0.01 MPa of the highest surface pressure was obtained, thereby obtaining the expanded molded article having a fusion ratio of 90% or more and a density of 25 kg/m$^3$, which was then measured for various physical properties.

The obtained expanded molded article had good appearance.

The results are indicated in Table 2 together with raw materials and production conditions.

The composition and thermal properties of the polyolefin-based resin used are shown in Table 1.

Example 2

An expanded molded article was obtained in the same manner as in Example 1 except that resin B shown in Table 1 was used as a polyolefin-based resin, and was evaluated for physical properties together with intermediate products.

The results are indicated in Table 2 together with raw materials and production conditions.

Figure 3:
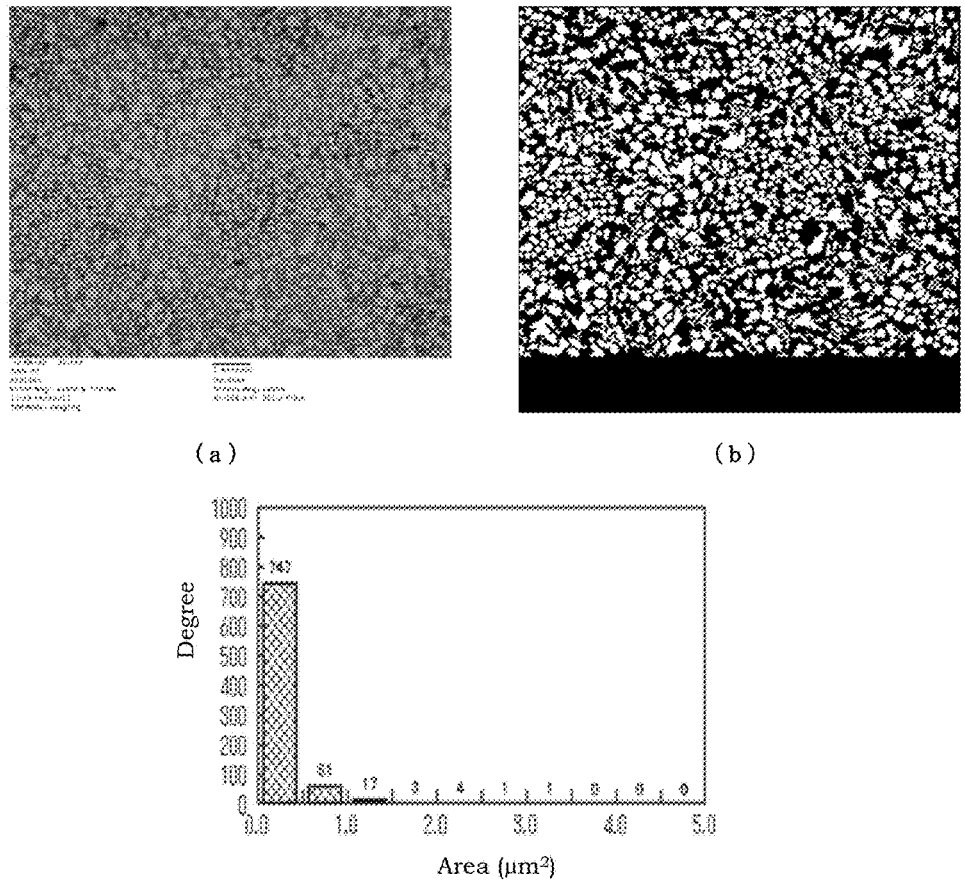
FIG. 3 exhibits (a) a TEM image and (b) a binarized image of cross-sections of composite resin particles of Example 2 and (c) the result of image analysis thereof (the area and degree of dispersed particles of the polystyrene-based resin).

FIG. 3 exhibits (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

Example 3

An expanded molded article was obtained in the same manner as in Example 1 except that resin D shown in Table 1 was used as a polyolefin-based resin, second polymerization was carried out at a temperature of 90° C., 5.5 g of benzoyl peroxide and 0.3 g of t-butyl peroxybenzoate were used as a polymerization initiator for second polymerization and 10 g of dicumyl peroxide was added as a crosslinking agent upon second polymerization, and was evaluated for physical properties together with intermediate products.

The results are indicated in Table 2 together with raw materials and production conditions.

Figure 4:
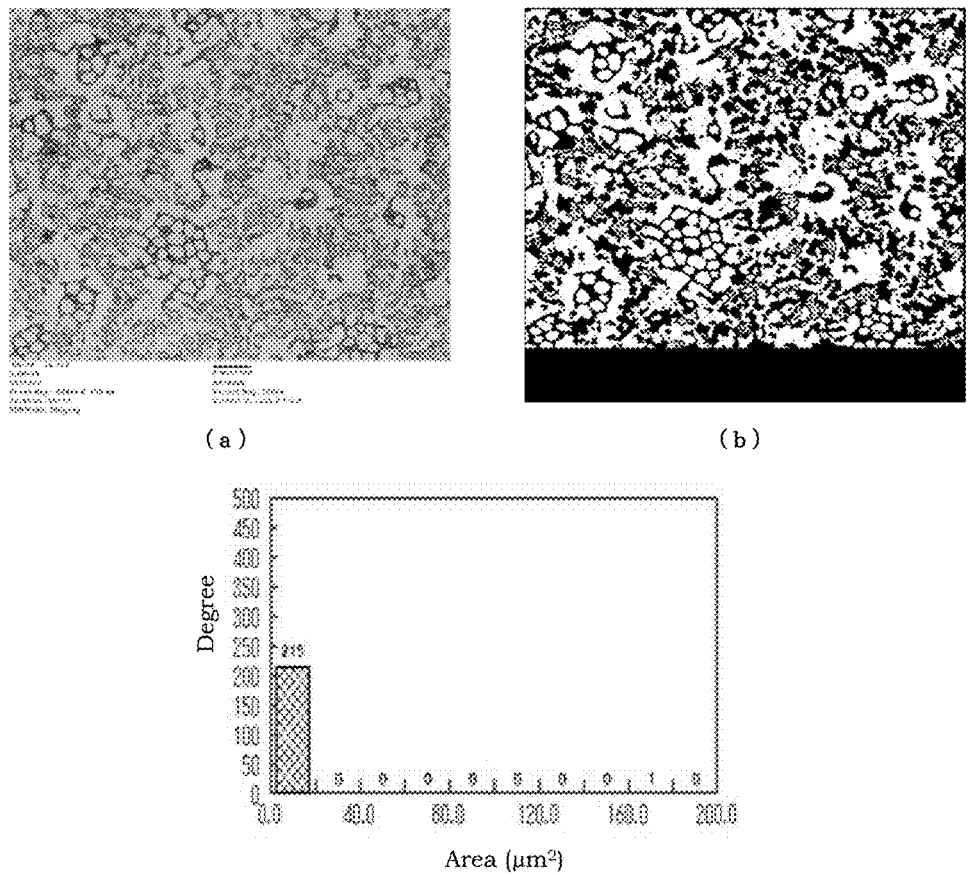
FIG. 4 exhibits (a) a TEM image and (b) a binarized image of cross-sections of composite resin particles of Example 3 and (c) the result of image analysis thereof (the area and degree of dispersed particles of the polystyrene-based resin).

FIG. 4 exhibits (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

Example 4

An expanded molded article was obtained in the same manner as in Example 1 except that resin F shown in Table 1 was used as a polyolefin-based resin, and was evaluated for physical properties together with intermediate products.

The results are indicated in Table 2 together with raw materials and production conditions.

Figure 5:
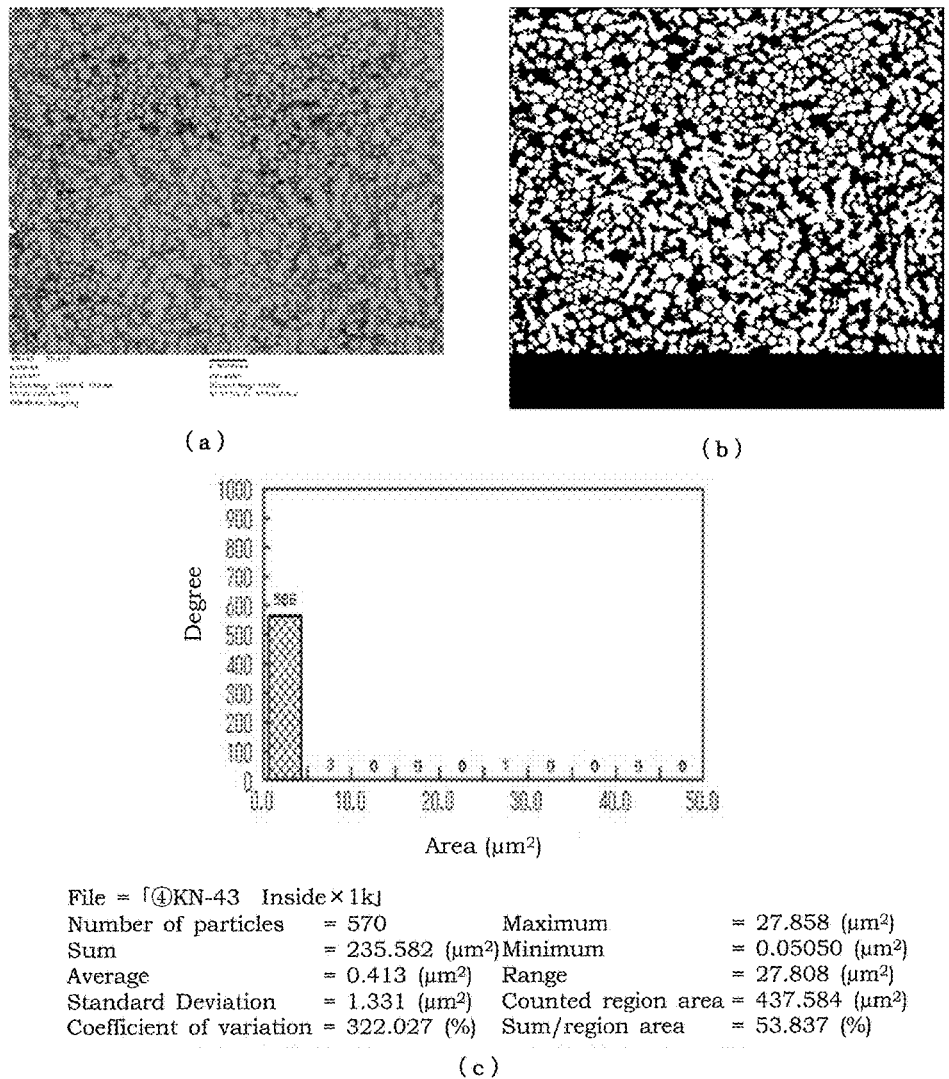
FIG. 5 exhibits (a) a TEM image and (b) a binarized image of cross-sections of composite resin particles of Example 4 and (c) the result of image analysis thereof (the area and degree of dispersed particles of the polystyrene-based resin).

FIG. 5 exhibits (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

Example 5

An expanded molded article was obtained in the same manner as in Example 1 except that resin C shown in Table 1 was used as a polyolefin-based resin and second polymerization was carried out at a temperature of 110° C., and was evaluated for physical properties together with intermediate products.

The results are indicated in Table 2 together with raw materials and production conditions.

Figure 8:
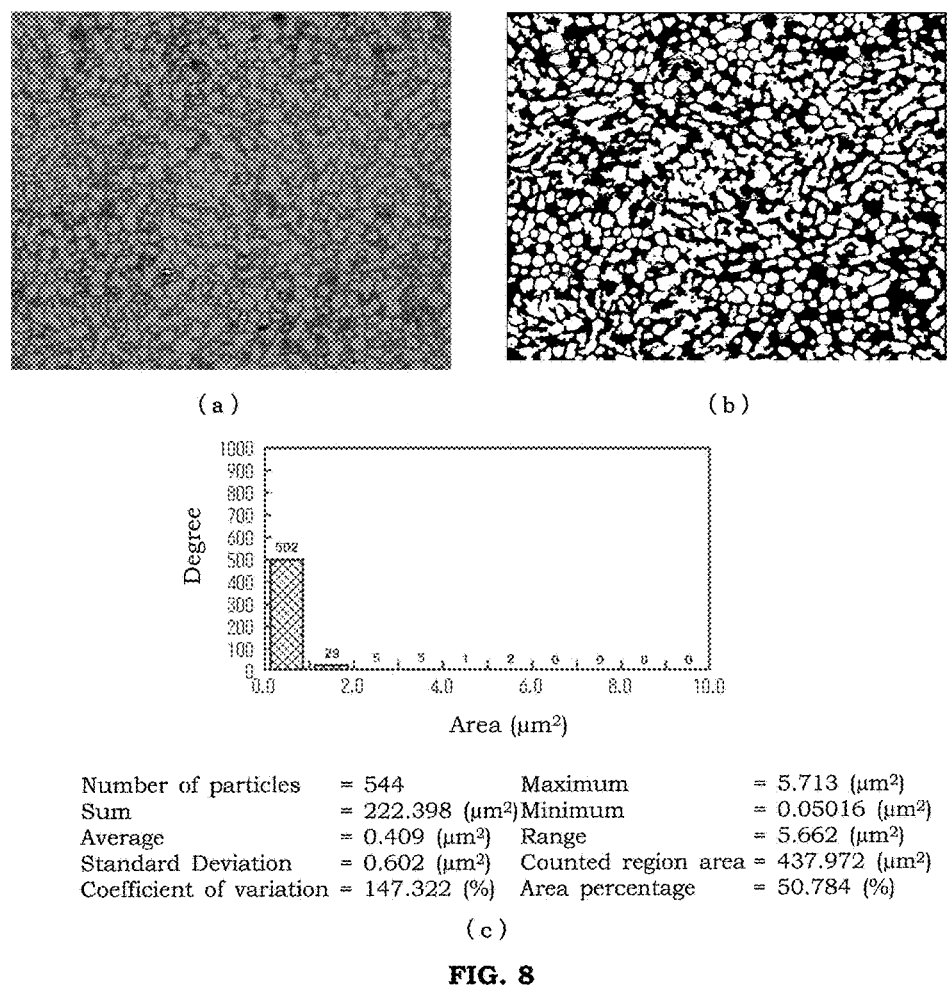
FIG. 8 exhibits (a) a TEM image and (b) a binarized image of cross-sections of composite resin particles of Example 5 and (c) the result of image analysis thereof (the area and degree of dispersed particles of the polystyrene-based resin).

FIG. 8 exhibits (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

Comparative Example 1

An expanded molded article was obtained in the same manner as in Example 1 except that second polymerization was carried out at a temperature of 130° C. and dicumyl peroxide was used as a polymerization initiator for second polymerization, and was evaluated for physical properties together with intermediate products.

The results are indicated in Table 2 together with raw materials and production conditions.

Figure 6:
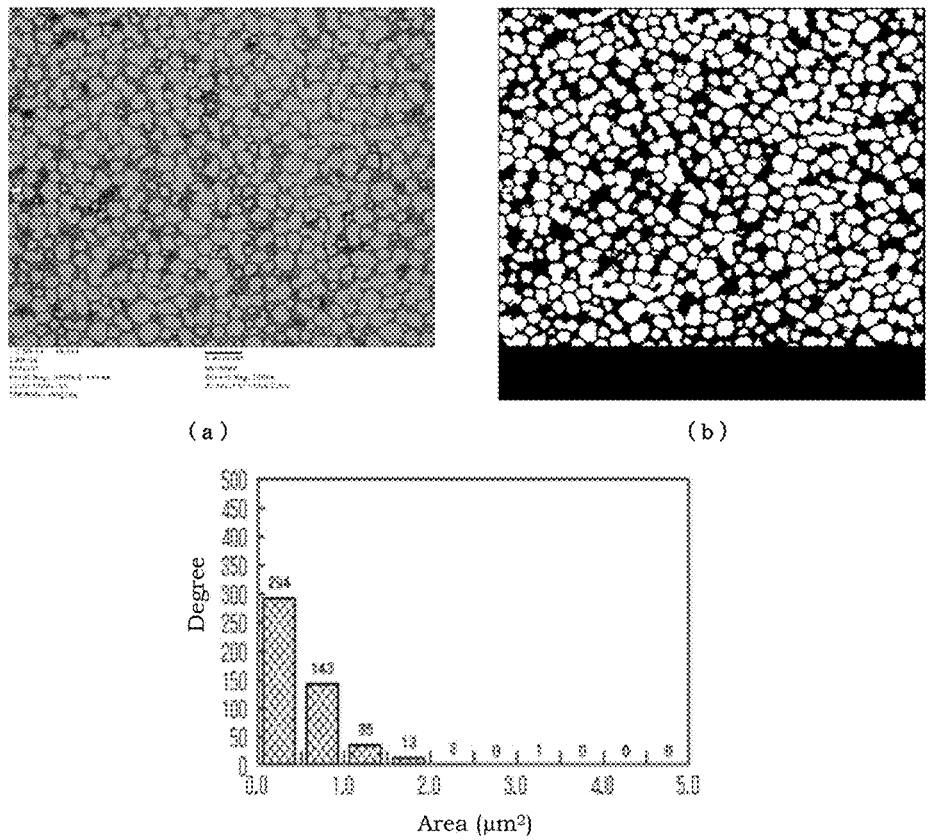
FIG. 6 exhibits (a) a TEM image and (b) a binarized image of cross-sections of composite resin particles of Comparative Example 1 and (c) the result of image analysis thereof (the area and degree of dispersed particles of the polystyrene-based resin).

FIG. 6 exhibits (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

Comparative Example 2

An expanded molded article was obtained in the same manner as in Example 1 except that resin E shown in Table 1 was used as a polyolefin-based resin, second polymerization was carried out at a temperature of 130° C. and dicumyl peroxide was used as a polymerization initiator for second polymerization, and was evaluated for physical properties together with intermediate products.

The results are indicated in Table 2 together with raw materials and production conditions.

Comparative Example 3

An expanded molded article was obtained in the same manner as in Example 1 except that second polymerization was carried out at a temperature of 80° C., 5.5 g of benzoyl peroxide and 0.3 g of t-butyl peroxybenzoate were used as a polymerization initiator for second polymerization and 10 g of dicumyl peroxide was added as a crosslinking agent upon second polymerization, and was evaluated for physical properties together with intermediate products.

The results are indicated in Table 2 together with raw materials and production conditions.

Figure 7:
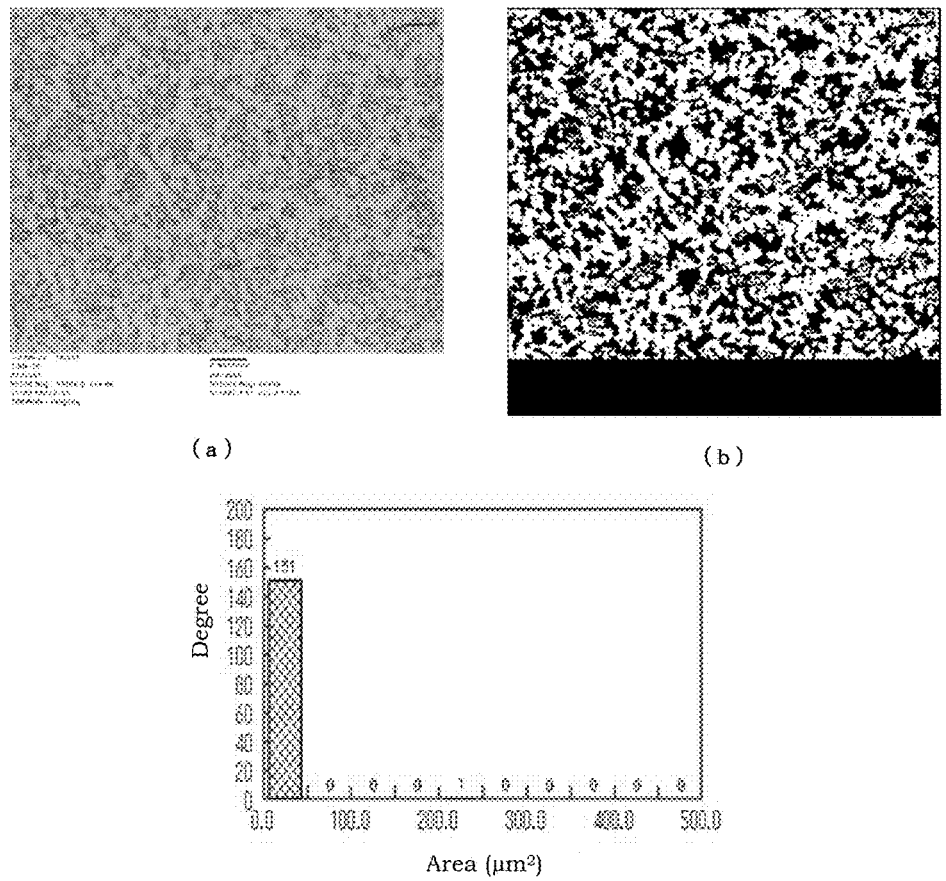
FIG. 7 exhibits (a) a TEM image and (b) a binarized image of cross-sections of composite resin particles of Comparative Example 3 and (c) the result of image analysis thereof (the area and degree of dispersed particles of the polystyrene-based resin).

FIG. 7 exhibits (a) a TEM image and (b) a binarized image of cross-sections of the obtained composite resin particles and (c) the result of image analysis thereof (the area and degree of dispersed particles of the polystyrene-based resin). From the results, the composite resin particles were evaluated for morphology.

TABLE 1

| | | | A | B | C | D | E | F |
|---|---|---|---|---|---|---|---|---|
| Composition | polyethylene-based resin (1) | Type* | SP4020 | SP4020 | F744NP | 10S65B | HY540 | SP4020 |
| | | Density (kg/m$^3$) | 937 | 937 | — | 940 | 960 | 937 |
| | | MFR (g/10 min) | 1.8 | 1.8 | 7.0 | — | 1.0 | 1.8 |
| | | Melting point (° C.) | 127 | 127 | 140 | — | 135 | 127 |
| | | Vicat softening point (° C.) | 117 | 117 | — | — | 129 | 117 |
| | polyethylene-based resin (2) | Type* | A1100 | LV430 | A1100 | LV430 | NF444A | WD201 |
| | | MFR (g/10 min) | 0.4 | 1.0 | 0.4 | 1.0 | 2.0 | 2.0 |
| | | Melting point (° C.) | 104 | 89 | 104 | 89 | 121 | 100 |
| | | Vicat softening point (° C.) | 83 | 73 | 83 | 73 | 93 | 75 |

TABLE 1-continued

|  |  | A | B | C | D | E | F |
|---|---|---|---|---|---|---|---|
|  | Proportion (mass) of resin (1)/resin (2) | 6/4 | 6/4 | 4/6 | 5/5 | 6/4 | 6/4 |
| DSC | Melting peak temperature T1/T2 (° C.) | 100/123 | 88/127 | 99/137 | 91/123 | 131 | 95/127 |
|  | Crystallization peak temperature (° C.) | 85/112 | 74/112 | 85/101 | 75/111 | 116 | 80/112 |

*SP4020: Manufactured by Prime Polymer Co., Ltd.; brand name: Evolue SP 4020
F744NP: Manufactured by Prime Polymer Co., Ltd.; brand name: Prime Polypro F744NP
10S65B: Manufactured by Tosoh Corporation
HY540: Manufactured by Japan Polyethylene Corporation, brand name: Novatec HD HY540
A1100: Manufactured by Japan Polyethylene Corporation, brand name: Rexpearl A1100
LV430: Manufactured by Japan Polyethylene Corporation, brand name: Novatec EVA LV430
NF444A: Manufactured by Japan Polyethylene Corporation, brand name: Harmorex NF444A
WD201: Manufactured by Sumitomo Chemical Co., Ltd., brand name: Acryft WD201

TABLE 2

|  |  |  |  | Ex. 1 | Ex. 2 | Ex. 3 | Ex. 4 |
|---|---|---|---|---|---|---|---|
| Composition |  | PO* (see Table 1) |  | A | B | D | F |
|  |  | PO*/PS** (mass ratio) |  | 30/70 | 30/70 | 30/70 | 30/70 |
| Polymerization |  | First polymerization temperature (° C.) |  | 140 | 140 | 140 | 140 |
|  |  | Second polymerization temperature (° C.) |  | 115 | 115 | 90 | 115 |
| Physical properties | Composite resin particles | Morphology | Appearance from TEM image | Co-continuous + sea-island | Co-continuous + sea-island | Co-continuous + sea-island | Co-continuous + sea-island |
|  |  | Binarized data PS dispersion | Number of particles | 513 | 834 | 216 | 570 |
|  |  |  | Average area (μm²) | 0.44 | 0.24 | 1.17 | 0.41 |
|  |  |  | Area standard deviation (μm²) | 0.75 | 0.31 | 11.41 | 1.33 |
|  |  |  | Maximum area (μm²) | 8.7 | 3.4 | 167.6 | 27.9 |
|  |  |  | Coefficient of variation (%) | 169 | 128 | 974 | 322 |
|  | Expanded particles |  | Expandability (fold) | 62 | 64 | 62 | 61 |
|  |  |  | Evaluation | (○) | (○) | (○) | (○) |
|  | Expanded article |  | Density (kg/cm³) | 25 | 25 | 25 | 25 |
|  |  |  | Falling ball impact strength (cm) | 49.5 | 51.5 | 45.5 | 45.5 |
|  |  |  | Evaluation | (○) | (○) | (○) | (○) |
|  |  |  | Chemical resistance | ○ | ○ | ○ | ○ |
|  |  |  | Fusion ratio (%) | 100 | 100 | 90 | 100 |
|  |  |  | Burning rate (mm/min) | AE | AE | AE | AE |

|  |  |  |  | Ex. 5 | Comp. Ex. 1 | Comp. Ex. 2 | Comp. Ex. 3 |
|---|---|---|---|---|---|---|---|
| Composition |  | PO* (see Table 1) |  | C | A | E | A |
|  |  | PO*/PS** (mass ratio) |  | 30/70 | 30/70 | 30/70 | 30/70 |
| Polymerization |  | First polymerization temperature (° C.) |  | 140 | 140 | 140 | 140 |
|  |  | Second polymerization temperature (° C.) |  | 110 | 130 | 130 | 80 |
| Physical properties | Composite resin particles | Morphology | Appearance from TEM image | Co-continuous + sea-island | Sea-island | Sea-island | Co-continuous |
|  |  | Binarized data PS dispersion | Number of particles | 544 | 489 | — | 152 |
|  |  |  | Average area (μm²) | 0.41 | 0.51 | — | 1.60 |
|  |  |  | Area standard deviation (μm²) | 0.60 | 0.41 | — | 16.53 |
|  |  |  | Maximum area (μm²) | 5.7 | 3.0 | — | 204.5 |
|  |  |  | Coefficient of variation (%) | 147 | 80 | — | 1032 |
|  | Expanded particles |  | Expandability (fold) | 60 | 47 | 20 | 66 |
|  |  |  | Evaluation | (○) | (X) | (X) | (○) |
|  | Expanded article |  | Density (kg/cm³) | 25 | 25 | No expansion until density of 25 kg/cm³ | 25 |
|  |  |  | Falling ball impact strength (cm) | 47.5 | 50.5 |  | 39.0 |
|  |  |  | Evaluation | (○) | (○) |  | (X) |
|  |  |  | Chemical resistance | ○ | ○ |  | ○ |
|  |  |  | Fusion ratio (%) | 70 | 90 |  | 100 |
|  |  |  | Burning rate (mm/min) | AE | 89 |  | AE |

*Polyolefin-based resin,
**Polystyrene-based resin

The results in Table 2 exhibit that composite resin particles of Examples 1 to 5 are expanded particles having both high impact resistance and high expandability. On the other hand, the results exhibit that composite resin particles of Comparative Examples 1 to 3 are defective in either or both impact resistance and expandability.

The (a) TEM images and (b) binarized images in FIGS. 2 to 8 exhibit that composite resin particles of Examples 1 to 5 have both sea-island structures and co-continuous structures, composite resin particles of Comparative Example 1 have only sea-island structure and composite resin particles of Comparative Example 3 have only co-continuous structure.

The invention claimed is:
1. Composite resin particles comprising 50 to 800 parts by mass of a polystyrene-based resin with respect to 100 parts by mass of a polyolefin-based resin, wherein:
when transmission electron microscope (TEM) images obtained by photographing cross-sections of the composite resin particles using a TEM at a magnification of

1,000 are subjected to a binarization processing and areas in the obtained binarized images which correspond to a cross-sectional area of 437.584 μm² of the composite resin particles are subjected to image analysis, the polystyrene-based resin satisfies the following requirements:
(1) the number of dispersed polystyrene-based resin particles is 180 or more;
(2) the maximum of the areas of dispersed polystyrene-based resin particles is 200 μm² or less; and
(3) the coefficient of variation in dispersion of the polystyrene-based resin particles is 100% or more, and
the composite resin particles exhibit an inner morphology that includes a mixture of sea-island structure and co-continuous structure regions in which particles of the polystyrene-based resin are dispersed in the polyolefin-based resin.

2. Expandable particles obtained by immersing a blowing agent in the composite resin particles according to claim 1.

3. Expanded particles obtained by expansion of the expandable particles according to claim 2.

4. An expanded molded article obtained by expansion molding in a cavity the expanded particles according to claim 3.

5. An automotive interior trim formed by the expanded molded article according to claim 4.

6. A method for producing the composite resin particles according to claim 1, comprising the steps of:
(A) dispersing, in an aqueous suspension containing a dispersant, particles of a polyolefin-based resin having at least two melting peaks in a differential scanning calorimetry (DSC) curve obtained by DSC; a styrene-based monomer; and 0.1 to 0.9 parts by mass of a polymerization initiator per 100 parts by mass of the styrene-based monomer to form a dispersion;
(B) heating the resulting dispersion at a temperature at which the styrene-based monomer does not substantially polymerize and immersing the styrene-based monomer in the particles of the polyolefin-based resin; and
(C) carrying out a first polymerization of the styrene-based monomer at a temperature in the range of T2 to (T2+35)° C., wherein T2° C. is the highest melting peak temperature among peaks, or the at least two melting peaks of the polyolefin-based resin, and
(D) following the first polymerization, adding additional styrene-based monomer and 0.1 to 0.9 parts by mass of an additional polymerization initiator per 100 parts by mass of the additional styrene-based monomer and carrying out immersion of the additional styrene-based monomer in the particles of the polyolefin-based resin and a second polymerization at a temperature in the range of (T1−10) to (T2+5)° C., wherein T1 is the lowest melting peak temperature among the at least two melting peaks of the polyolefin-based resin.

7. The method for producing the composite resin particles according to claim 6, wherein a temperature difference between the melting peak temperature T2 and the melting peak temperature T1 is 10 to 50° C.

8. The method for producing the composite resin particles according to claim 6, wherein the melting peak temperature T1 is 90° C. or higher.

9. The method for producing the composite resin particles according to claim 6, wherein the polyolefin-based resin has at least two crystallization peaks in the DSC curve among which a crystallization peak at the highest temperature has a maximum peak area.

10. The method for producing the composite resin particles according to claim 6, wherein the polyolefin-based resin contains a component selected from a polyethylene resin and an ethylene-acryl copolymer resin.

* * * * *

UNITED STATES PATENT AND TRADEMARK OFFICE
CERTIFICATE OF CORRECTION

PATENT NO. : 10,066,072 B2
APPLICATION NO. : 15/512222
DATED : September 4, 2018
INVENTOR(S) : Owaki Page 1 of 1

It is certified that error appears in the above-identified patent and that said Letters Patent is hereby corrected as shown below:

In the Claims

Column 30, Line 7 (Claim 6) please change "among peaks, or the" to -- among the --

Signed and Sealed this
Nineteenth Day of March, 2019

Andrei Iancu
*Director of the United States Patent and Trademark Office*